US006839163B1

(12) United States Patent
Jakobson et al.

(10) Patent No.: US 6,839,163 B1
(45) Date of Patent: Jan. 4, 2005

(54) APPARATUS AND METHOD FOR MAKING AN OPTICAL FIBER AMPLIFIER

(75) Inventors: Paul A. Jakobson, Big Flats, NY (US); Edward F. Murphy, Painted Post, NY (US); Todd M. Wetherill, Painted Post, NY (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/387,961

(22) Filed: Sep. 1, 1999

(51) Int. Cl.[7] .................................................. H01S 3/00

(52) U.S. Cl. .................................... 359/341.1; 398/164

(58) Field of Search ........................ 398/164; 359/341.1, 359/33, 34, 333, 337, 337.11, 341.4, 341.41, 341.42

(56) References Cited

U.S. PATENT DOCUMENTS

| | | | | |
|---|---|---|---|---|
| 3,948,582 A | * | 4/1976 | Martin .......................... | 385/56 |
| 4,527,285 A | | 7/1985 | Kekas et al. ................. | 455/607 |
| 5,173,957 A | * | 12/1992 | Bergano et al. ............... | 385/24 |
| 5,198,684 A | | 3/1993 | Sudo ........................... | 257/79 |
| 5,253,104 A | | 10/1993 | Delavaux .................... | 359/341 |
| 5,275,317 A | | 1/1994 | Rogers et al. ............... | 224/244 |
| 5,280,383 A | * | 1/1994 | Federici et al. ........... | 359/341.1 |
| 5,383,051 A | * | 1/1995 | Delrosso et al. ......... | 359/341.1 |
| 5,392,154 A | | 2/1995 | Chang et al. ................ | 359/341 |
| 5,469,526 A | * | 11/1995 | Rawlings .................... | 385/135 |
| 5,475,592 A | | 12/1995 | Wnuk et al. ........... | 364/424.05 |
| 5,500,756 A | * | 3/1996 | Tsushima et al. ........... | 359/110 |
| 5,515,200 A | | 5/1996 | Delrosso et al. ............. | 359/341 |
| 5,535,037 A | * | 7/1996 | Yoneyama .................. | 359/177 |
| 5,572,617 A | * | 11/1996 | Bernhardt et al. .......... | 385/135 |
| 5,579,154 A | * | 11/1996 | Mueller-Fiedler et al. ....................... | 359/341.1 |
| 5,594,825 A | * | 1/1997 | Kawasaki et al. ............ | 385/27 |
| 5,696,615 A | | 12/1997 | Alexander ................... | 359/134 |
| 5,726,788 A | * | 3/1998 | Fee et al. .................... | 359/163 |
| 5,727,110 A | | 3/1998 | Smith et al. ................ | 385/147 |
| 5,737,194 A | | 4/1998 | Hopkins et al. ............ | 361/800 |
| 5,764,826 A | | 6/1998 | Kuhara et al. ................ | 385/24 |

(List continued on next page.)

FOREIGN PATENT DOCUMENTS

JP          62076332 A    *    4/1987    ............ H04B/9/00

OTHER PUBLICATIONS

Iwano et al. Journal of Lightwave Technology vol. 8 No. 11, Nov. 1990.*
Becker et al. Erbium doped fiber amplifiers: Fundamentals and Technology. Academic Press Mar. 8, 1999.*
Giles et al. IEEE photonics technology letters. vol. 3, No. 4. Apr. 1991.*
Kinoshita et al. OAA '98 Technical Digest Jul. 1998.*
Nishida et al. IEEE Photonics Tech. Letts vol. 9 No. 8 Aug. 1997.*
Mirriam–Webster's Collegiate Dictionary.*

*Primary Examiner*—Mark Hellner
*Assistant Examiner*—Deandra M. Hughes
(74) *Attorney, Agent, or Firm*—Moser, Patterson & Sheridan, L.L.P.

(57) ABSTRACT

An apparatus and method for making n different types of optical amplifiers on one manufacturing line, n being equal to 2 or more. The method includes providing a supply of at least four functional groups of subunits for each of the circuits which comprise each of the optical amplifiers to be made, where at least one functional group contains at least n different types of sub-units, and where each of the sub-units in three of the functional groups includes a pluggable optical connector half and where each of the sub-units of the fourth of the functional groups includes three pluggable optical connector halves. The method further includes selecting a specific sub-unit from each of the four functional groups and plugging together each of the selected subunits to form an optical amplifier having the desired specification.

37 Claims, 13 Drawing Sheets

U.S. PATENT DOCUMENTS

| | | | | |
|---|---|---|---|---|
| 5,778,132 A | * | 7/1998 | Csipkes et al. | 359/341.1 |
| 5,808,785 A | * | 9/1998 | Nakabayashi | |
| 5,809,196 A | | 9/1998 | Meli et al. | |
| 6,008,934 A | * | 12/1999 | Fatehi et al. | 359/176 |
| 6,021,234 A | * | 2/2000 | Van Deventer | 385/24 |
| 6,023,366 A | * | 2/2000 | Kinoshita | 359/177 |
| 6,049,413 A | | 4/2000 | Taylor et al. | 359/337 |
| 6,052,393 A | | 4/2000 | Islam | |
| 6,101,024 A | | 8/2000 | Islam et al. | |
| 6,132,104 A | | 10/2000 | Bliss et al. | 385/53 |
| 6,134,047 A | * | 10/2000 | Flood et al. | 359/174 |
| 6,236,499 B1 | | 5/2001 | Berg et al. | 59/341 |
| 6,292,291 B1 | | 9/2001 | Yoon et al. | 359/337.13 |
| 6,411,407 B1 | * | 6/2002 | Maxham | 359/110 |
| 2001/0008459 A1 | * | 7/2001 | Ohshima et al. | 359/341.44 |

* cited by examiner

APPARATUS AND METHOD FOR MAKING AN OPTICAL FIBER AMPLIFIER

FIELD OF THE INVENTION

The present invention relates to optical fiber telecommunication systems and, in particular, to a rare earth doped optical fiber amplifier employed in such systems.

BACKGROUND INFORMATION

An optical transmission signal fades with distance when traveling through any type of optical fiber telecommunication system and, thus, needs amplification. In this regard, optical fiber amplifiers are used to transform a weak input optical transmission signal into a strong output optical transmission signal. Optical fiber amplifiers contain optical fibers with cores doped with certain rare earth elements, such as, erbium, that amplify light at certain wavelengths. The amplified wavelengths depend primarily on the rare earth dopant and on the fiber composition. Typically, a rare earth doped optical fiber amplifier utilizes a light source from an external laser, such as a semiconductor pump laser, to excite the dopant atoms in the optical fiber from a ground state to a higher energy level, whereby light from an optical transmission signal having a signal wavelength can stimulate these excited atoms to emit their excess energy as light at the signal wavelength, thus resulting in an amplified optical transmission signal. The degree of amplification depends on the excitation power input, as well as on the excitation wavelength. Standard erbium-doped fiber amplifiers amplify light having a wavelength in the range of about 1520 and 1610 nanometers and are usually pumped by commercially available semiconductor pump lasers that emit light at either 980 or 1480 nanometers.

In telecommunication systems, such as metropolitan area networks (MANs), which can span a geographical area the size of a city, a plurality of optical fiber amplifiers are optically linked together. Each optical amplifier in such a network must satisfy a number of rigorous technical requirements in order to assure reliable and accurate communications within a fiber-optic network. Further, each optical amplifier in a network has a unique set of components that require individual fabrication and testing. Ordinarily, in many long-distance applications, each optical amplifier in the network is spliced to a transmission line fiber and further the optical components that comprise each of the amplifiers are also spliced together. Since splicing results in a permanent connection and generally results in a lower attenuation of an optical signal-splices are the preferred way to join lengths of fiber in long-haul telecommunication systems. To provide good optical performance, the optical fibers used in such amplifiers and the various optical components contained therein need to be optically connected such that there is minimal signal loss. Because the manufacture of optical amplifiers typically requires optically connecting various sections of fiber, many points of failure are possible. Accordingly, any failure in a network generally requires shutting down the network to access one or more of the failed components. Troubleshooting the cause of a network failure is time consuming, hence, the cost of a network failure can nm into hundreds of thousands, if not millions, of dollars in lost communications.

Typically, during manufacturing, optical fiber amplifiers are individually assembled with a particular focus on an amplifier's location and function within a network. For instance, an optical amplifier can be used as an in-line amplifier between cable segments, as a post-amplifier or an output amplifier to increase transmitter output, as a pre-amplifier or an input amplifier to increase receiver sensitivity or combined with other components to offset high losses. Such individualized amplifier manufacturing techniques have been one of the contributing factors in the high cost of optical fiber amplifiers. When a newly assembled optical fiber amplifier fails to meet the desired technical specifications and needs reworking, such failures lead to significant delays in the production process. In addition, when manufacturing more than one type of amplifier for a network system, such delays in reworking are multiplied and can result in significant monetary loss due to the precise assembly and testing procedures utilized.

In light of the foregoing, it is desirable to simplify the manufacturing and testing process for optical fiber amplifiers and, also, increase amplifier production with minimal rework. Further, it is desirable to provide a method for coupling multiple pump lasers to a doped optical fiber amplifier in order to provide high output power. Also, it is desirable to simplify the assembly of different types of amplifiers, where common components in the different amplifiers can be easily utilized in assembling more than one amplifier. Furthermore, it is desirable to reduce transmission equipment costs, improve line reliability and simplify maintenance and operation functions of optical communication systems.

SUMMARY OF THE INVENTION

The present invention is directed to an optical fiber amplifier that substantially obviates one or more of the limitations and disadvantages of the related art. The present invention provides a solution to the problems described above relating to the manufacture of optical fiber amplifiers. Specifically, the invention provides a method of making n different types of optical amplifiers on one manufacturing line, n being equal to or greater than 2.

To achieve these and other advantages and in accordance with the purpose of the invention, as embodied and broadly described, the method includes providing a supply of at least four functional groups of sub-units for each of the circuits which comprise each of the optical amplifiers to be made. Each sub-unit contains at least one or more of a plurality of optical components. Further, at least one functional group contains at least n different types of sub-units, n being equal to or greater than 2, where each of the sub-units in three of the functional groups includes a pluggable optical connector half and where each of the sub-units of the fourth of the functional groups includes three pluggable optical connector halves. The method includes selecting a specific sub-unit from each of the functional groups depending on the specification of the optical amplifier to be made, and plugging together each of the selected sub-units on a larger substrate or support board to form an optical amplifier having the desired specification.

Additionally, the selecting step first includes comparing the optical components in each of the sub-units for the four functional groups for each of at least two or more amplifiers that is to be constructed and based on the comparisons, providing at least two different pluggable sub-units for each of the four functional groups. In one embodiment, there are provided at least two or more pluggable sub-units containing pump components, at least two or more pluggable sub-units containing input components, at least two or more pluggable sub-units containing optical signal amplifying components and at least two or more pluggable sub-units containing output components. The providing step includes arranging the optical components on each of the sub-units such that a splice between any two optical components is a low-loss and a high strength splice. Further, the selecting step includes selecting at least four pluggable sub-units that represent all four functional groups and testing each of the selected pluggable sub-units to ensure that each selected sub-unit meets a desired specification. Finally, the plugging step includes mounting each of the tested sub-units onto a substrate or a support board, which in a preferred embodiment is a printed circuit board, to construct an optical amplifier having the desired specification.

In accordance with the present invention, in one embodiment, an optical amplifier manufactured by this method has a basic construction that includes a first, second, third and fourth pluggable sub-unit, each sub-unit being mounted onto a support board, where each of the first, third and fourth sub-units are plugged into the fourth sub-unit. The first pluggable sub-unit comprises a first pump source having a pump wavelength of $\lambda_1$ the second pluggable sub-unit comprises a plurality of first stage optical signal amplifying components, the third pluggable sub-unit comprises a plurality of input stage components and the fourth pluggable sub-unit comprises a plurality of output stage components. In addition, the second pluggable sub-unit is optically connected to each of the first, third and fourth pluggable sub-units via a first, third and fourth board mountable fiber-optic connector, respectively. In a preferred embodiment, a fifth pluggable sub-unit is mounted onto the support board, where the fifth pluggable sub-unit comprises a second pump source having a wavelength of $\lambda_2$, and the fifth pluggable sub-unit is optically connected to the second pluggable sub-unit via a fifth board mountable fiber-optic connector. In yet another embodiment, the second pluggable sub-unit further comprises a plurality of second stage optical signal amplifying components.

In a preferred embodiment, $\lambda_1=\lambda_2$, with each of the first pump source and the second pump source having a wavelength of 980 or, alternatively, 1480 nanometers. In an alternative embodiment, $\lambda_2<\lambda_2$, with the first pump source having a wavelength of 980 nm, and the second pump source having a wavelength of 1480 nm. In yet another embodiment, $\lambda_2<\lambda_1$, with the first pump source having a wavelength of 1480 nm, and the second pump source having a wavelength of 980 nm.

BRIEF DESCRIPTIONS OF THE DRAWINGS

DESCRIPTION OF THE PREFERRED EMBODIMENTS

Figure 1:
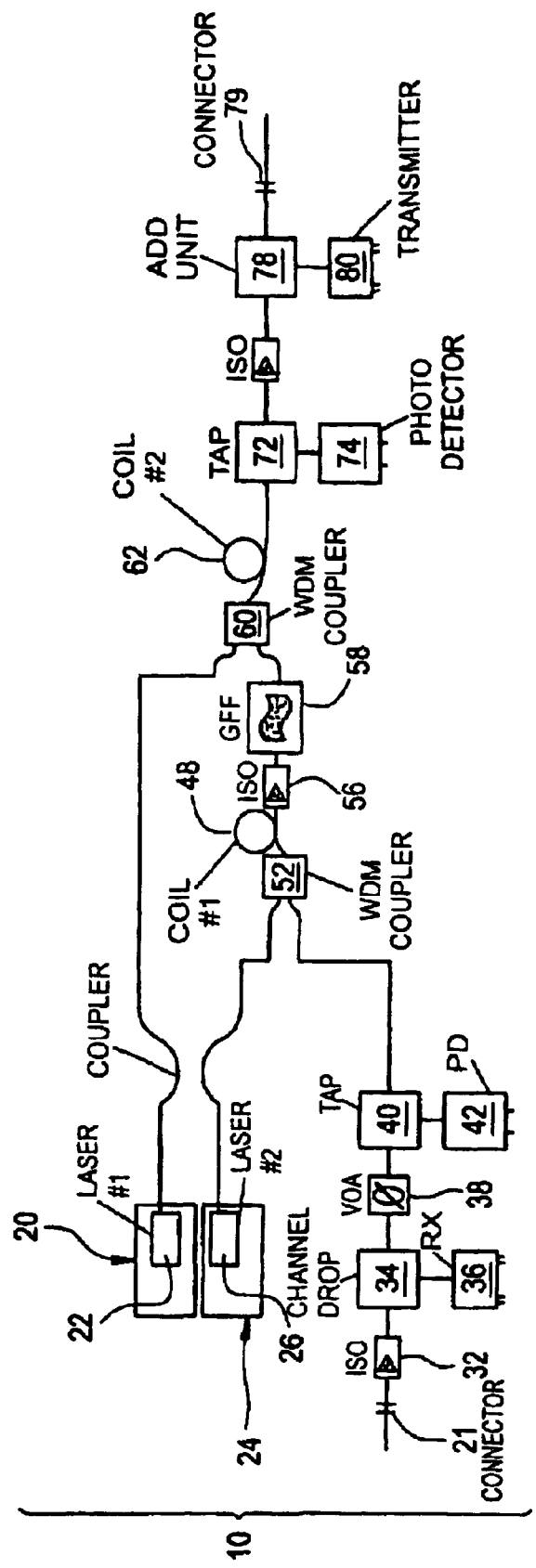
FIGS. 1–4 are diagrammatic illustrations showing a multi-channel line amplifier, an input amplifier having a 14 dB net gain, an output amplifier and an input amplifier having a 9 dB net gain, respectively, constituting a family of amplifiers for use in a metropolitan area network in accordance with the present invention.
Figure 2:
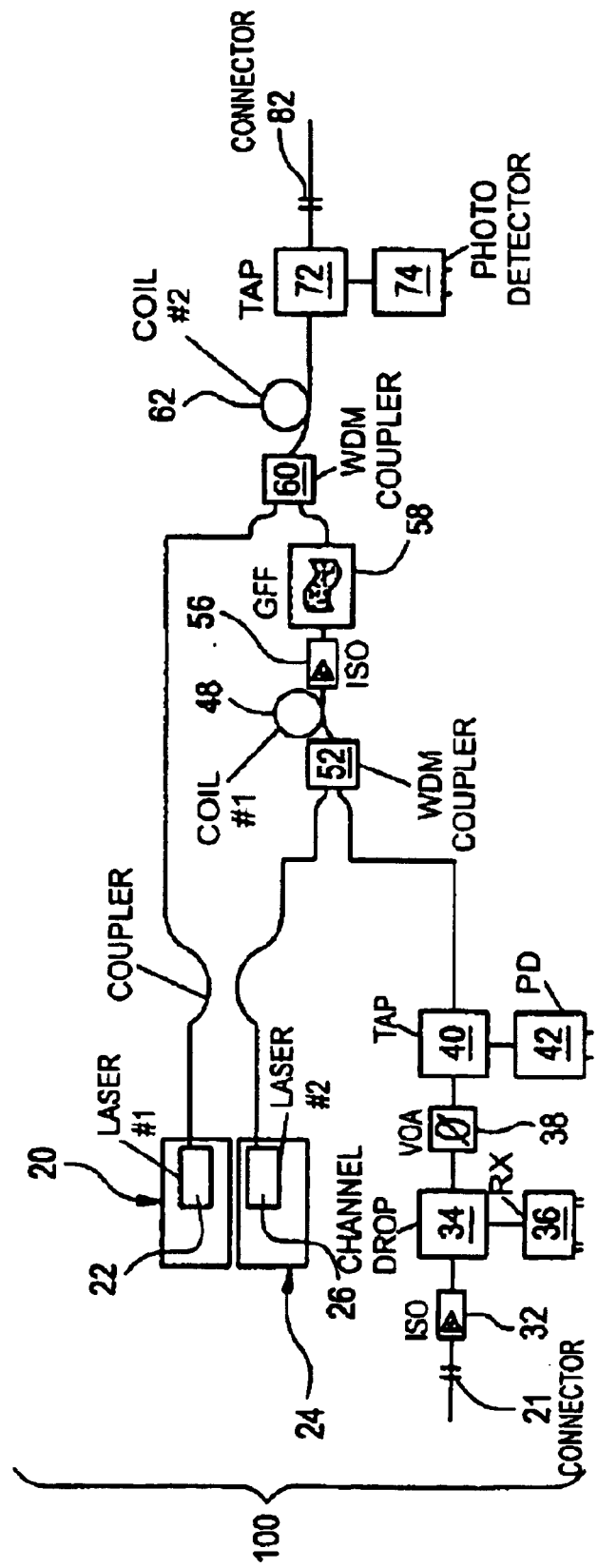
Figure 3:
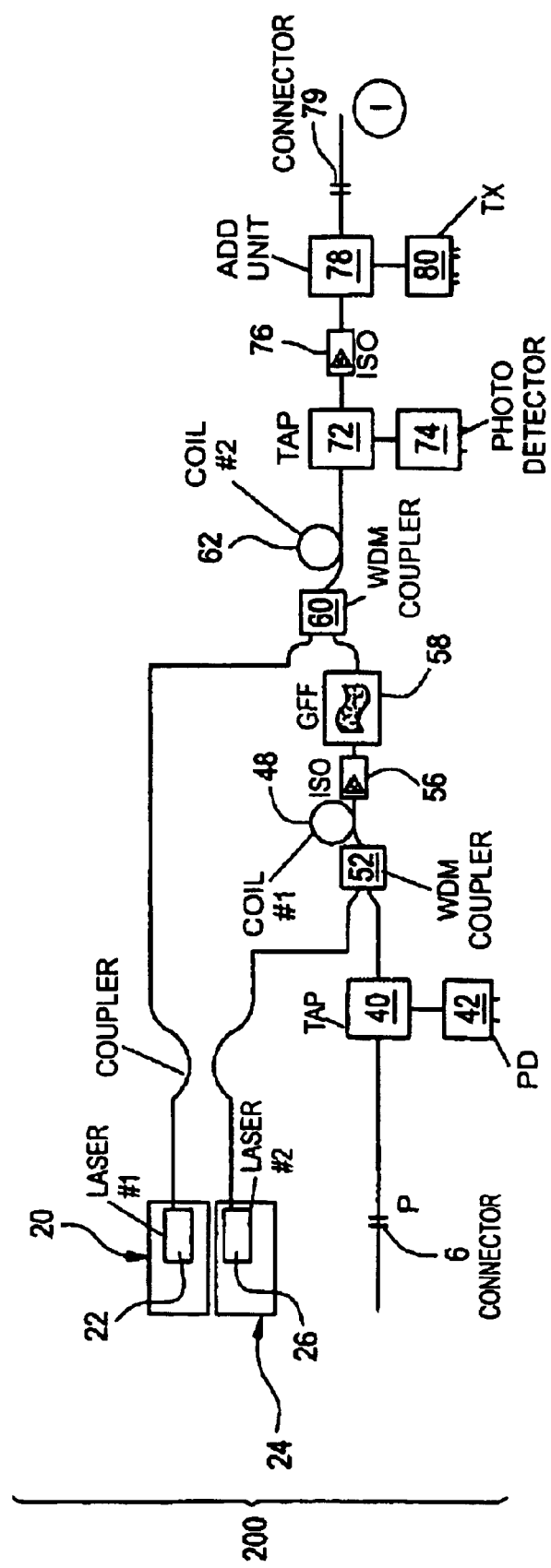
Figure 4:
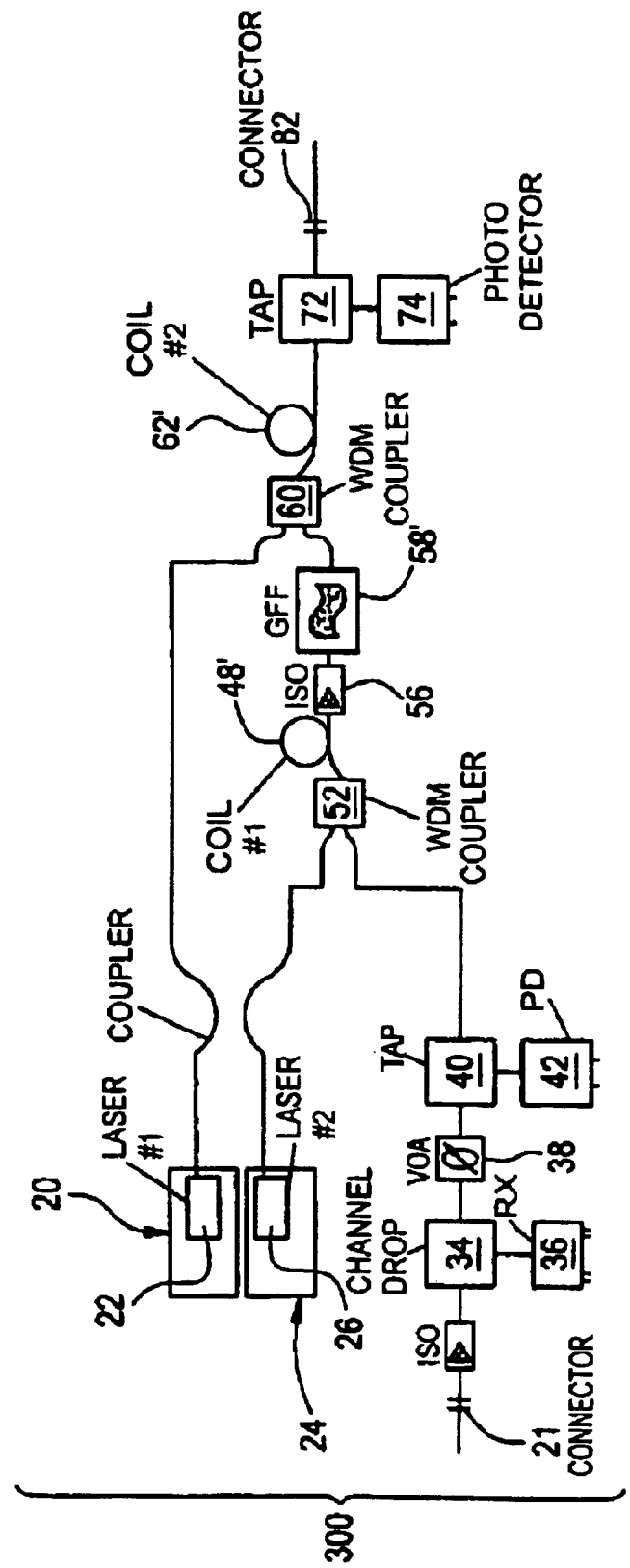

The invention disclosed herein generally embodies the provision of an optical fiber amplifier constructed of a plurality of detachable pluggable sub-units. The invention also provides a method of making an optical fiber amplifier by plugging together at least three, preferably, four pluggable sub-units. Although, the description will discuss the manufacture of a family of four optical fiber amplifiers that are used in a metropolitan area network, the invention provides a method of making any one of a family of N optical fiber amplifiers by plugging together at least three, preferably, four different sub-units.

As shown in FIGS. 1–4, the four optical amplifiers are designated 10, 100, 200 and 300, respectively. Basically, the optical components that comprise each of these four optical fiber amplifiers 10, 100, 200 and 300 can be grouped into four different functional groups. These four different functional groups are: pump components, input components, optical signal amplifying components, and output components. Each of the four amplifiers has all four functional groups (that is, pump, input, amplifying and output) of optical components, where each functional group is made up of one or more optical components. Although the optical components for each of the four amplifiers can be divided into four functional groups, there are similarities and differences in the make-up of the optical components that comprise any one particular functional group for a given amplifier. Accordingly, for all four amplifiers, a comparison is made to determine which, if any, of the optical components in a given functional group are common to at least two or more of the four amplifiers. For instance, the optical components that comprise the pump components group of amplifier 10 are compared with the optical components that comprise the pump components group of each of the amplifiers 100, 200 and 300 to determine whether any of the pump components are common to two or more of the amplifiers. Similarly, the optical components that comprise the input components group of amplifier 10 are compared with the optical components that comprise the input components group of each of the amplifiers 100, 200 and 300 to determine whether any of the input components are common to two or more of the amplifiers. Further, the optical components that comprise the output components group of amplifier 10 are compared with the optical components that comprise the output components group of each of the amplifiers 100, 200 and 300 to determine whether any of the output components are common to two or more of the amplifiers, and finally, the optical components that comprise the optical signal amplifying components group of amplifier 10 are compared with the optical components that comprise the optical signal amplifying components group of each of the amplifiers 100, 200 and 300 to determine whether any of the optical signal amplifying components are common to two or more of the amplifiers.

Based on these comparisons, at least two or more different sub-units are formed for each functional group, where at least one sub-unit houses the maximum number of optical components that are common to two or more of the amplifiers. In a preferred embodiment, each of the sub-units is a substrate or support board, preferably, a printed circuit board having the appropriate components mounted there. Hence, in accordance with this invention, theoretically, the optical components used to manufacture all four amplifiers 10, 100, 200 and 300 can be divided into a total of 16 separate sub-units, four sub-units are the pump components sub-units, four sub-units are the input components sub-units, four sub-units are the optical signal amplifying components sub-units and where four sub-units are the output components sub-units. Furthermore, in order to optically connect one sub-unit to another, the pump, input and output sub-units each has mounted on it one first-half member of a pluggable optical connector and the optical signal amplifying sub-units each has mounted on it three second-half members of the pluggable optical connectors where the first-half members are adapted to engage or plug into the second-half members, such that any combination of at least four such pluggable (having a mating half member of a pluggable type optical connector) sub-units representing all four functional groups can be plugged together and mounted on a larger substrate or support board to construct any desired optical fiber amplifier. In addition, each of the pluggable sub-units are individually tested before being assembled on to a larger substrate or support board to ensure that each of the pluggable sub-units meets the required specification.

In general, for manufacturing N optical fiber amplifiers (N being equal to or greater than two), with each amplifier having optical components that can be divided into four functional groups, there are provided at least two different bins each containing a pluggable sub-unit (that is, a sub-unit that has mounted on it a respective mating half member of a pluggable type optical connector) for a particular functional group. Each of the pluggable sub-units has mounted on it a plurality of optical components pertaining to that particular functional group. To manufacture an optical amplifier, a pluggable sub-unit from each of the four functional groups is mounted onto a larger substrate or support board and each of the four sub-units are plugged together via the respective pluggable type optical connectors to construct the amplifier.

As a specific example, for manufacturing any one of the four amplifiers 10, 100, 200 and 300, first a comparison of the optical components in each of the four functional 115 groups for all four amplifiers is made. Based on the comparisons, there are provided at least eight separate bins, where at least two bins each contain a pluggable sub-unit for one of the four functional groups. Although, in this case, the comparison of the optical components in each functional group results in eight separate bins, theoretically, there can be sixteen separate bins for assembling any one of the four amplifiers 10, 100, 200 and 300, depending on the make-up of the optical components in each functional group. However, in the present invention, since there is an overlap of a plurality of optical components in each amplifier that is used in at least two or more of the four amplifiers, there are provided at least two bins each containing pluggable pump sub-units, at least two bins each containing pluggable input sub-units, at least two bins each containing pluggable optical signal amplifying sub-units and two bins each containing pluggable output sub-units, where a pluggable sub-unit from each of the four functional groups is selected to construct any one of the four optical amplifiers 10, 100, 200 or 300. More specifically, at least a pluggable pump sub-unit, more preferably, two pluggable pump sub-units each having a pump laser operating at either the same or different output wavelengths are selected along with an input sub-unit, an optical signal amplifying sub-unit and an output sub-unit. The selection of the sub-units is dictated by the type of optical amplifier to be constructed. Upon selecting at least four, preferably, five pluggable sub-units representing all four functional groups, each of the selected pump, input, optical signal amplifying and output sub-units are mounted onto a substrate or a support board, which in a preferred embodiment is a printed circuit board. Each of the first-half members of the respective pluggable fiber-optic connectors that are mounted on each of the selected pump, input and output sub-units is optically plugged into the respective second-half member mounted on the selected optical signal amplifying sub-unit to construct a desired amplifier.

Thus, by selectively choosing and by optically connecting together at least four specific sub-units (one from each of the four functional groups of optical components), any one of the four optical amplifiers can be constructed. Furthermore, there is no need to shut down the assembly line when switching production, for instance, when switching between the production of amplifier 10 and the production of amplifier 200. Furthermore, since each of the pluggable sub-units are tested independently before the respective pluggable sub-units are assembled together into a larger wut, minimal rework is required in ensuring that each of the optical amplifiers constructed meets the technical requirements and in assuring that reliable and accurate communication within a fiber-optic network is achieved. Moreover, since each of the pluggable sub-units is detachable, any one of the sub-units can be easily removed from the optical amplifier unit if there is a sub-unit failure. Thus, the pluggable fiber-optic connectors provide the convenient feature of being able to attach and detach any one of the sub-units from the optical amplifier unit for maintenance purposes. In addition, the construction of an optical amplifier with two different pump sub-units addresses the problem with pump failure. For instance, if one of the pump sub-units fails, the second pump sub-unit serves as a back-up pump to power the optical amplifier, thus, avoiding an amplifier failure. Accordingly, constructing an optical amplifier in this manner simplifies the manufacturing process and simplifies the testing process of such optical amplifiers, which leads to an overall increase in the production rate.

Figure 5:
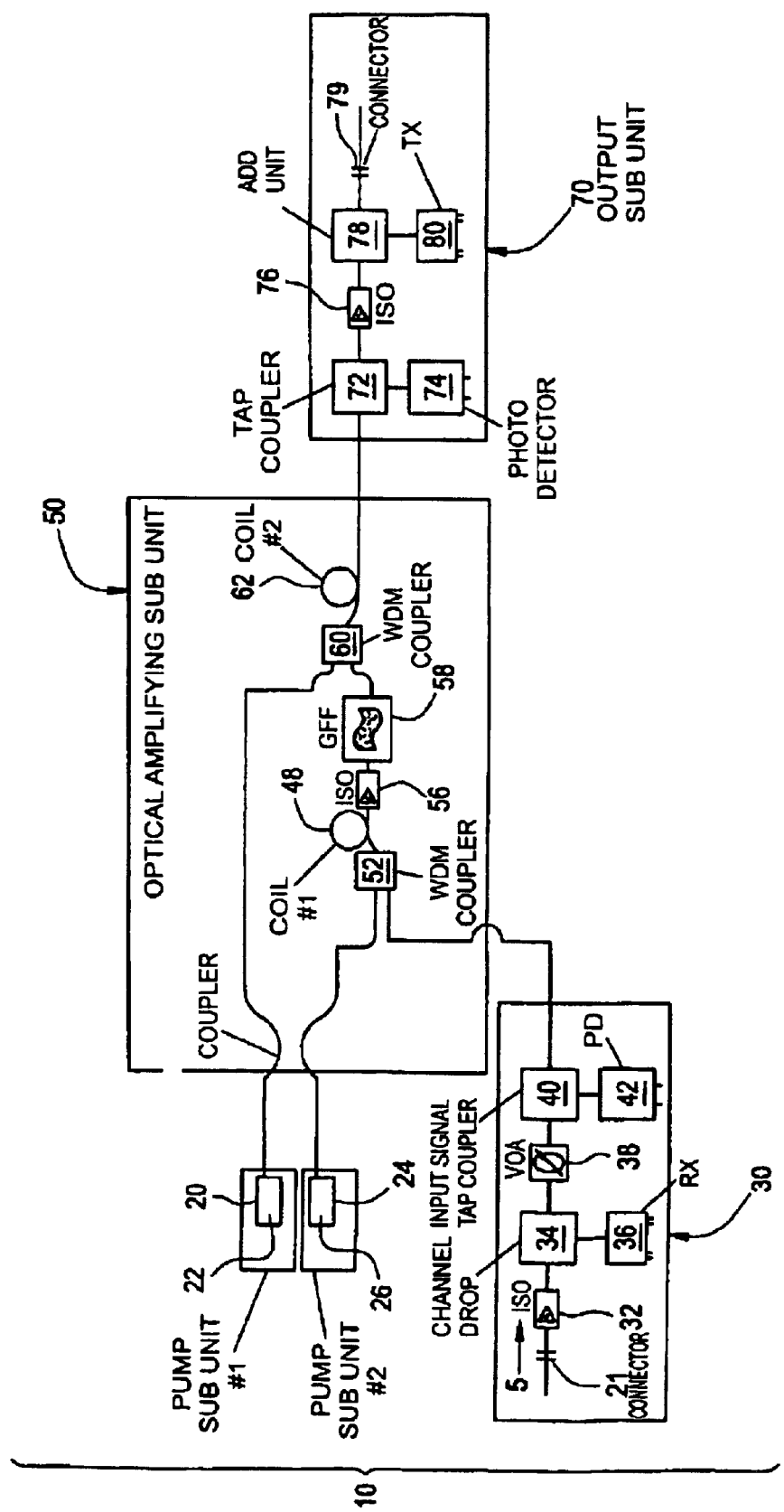
FIGS. 5–8 are diagrammatic illustrations dividing the optical components into different functional groups for each of the amplifiers shown in FIGS. 1–4.
Figure 6:
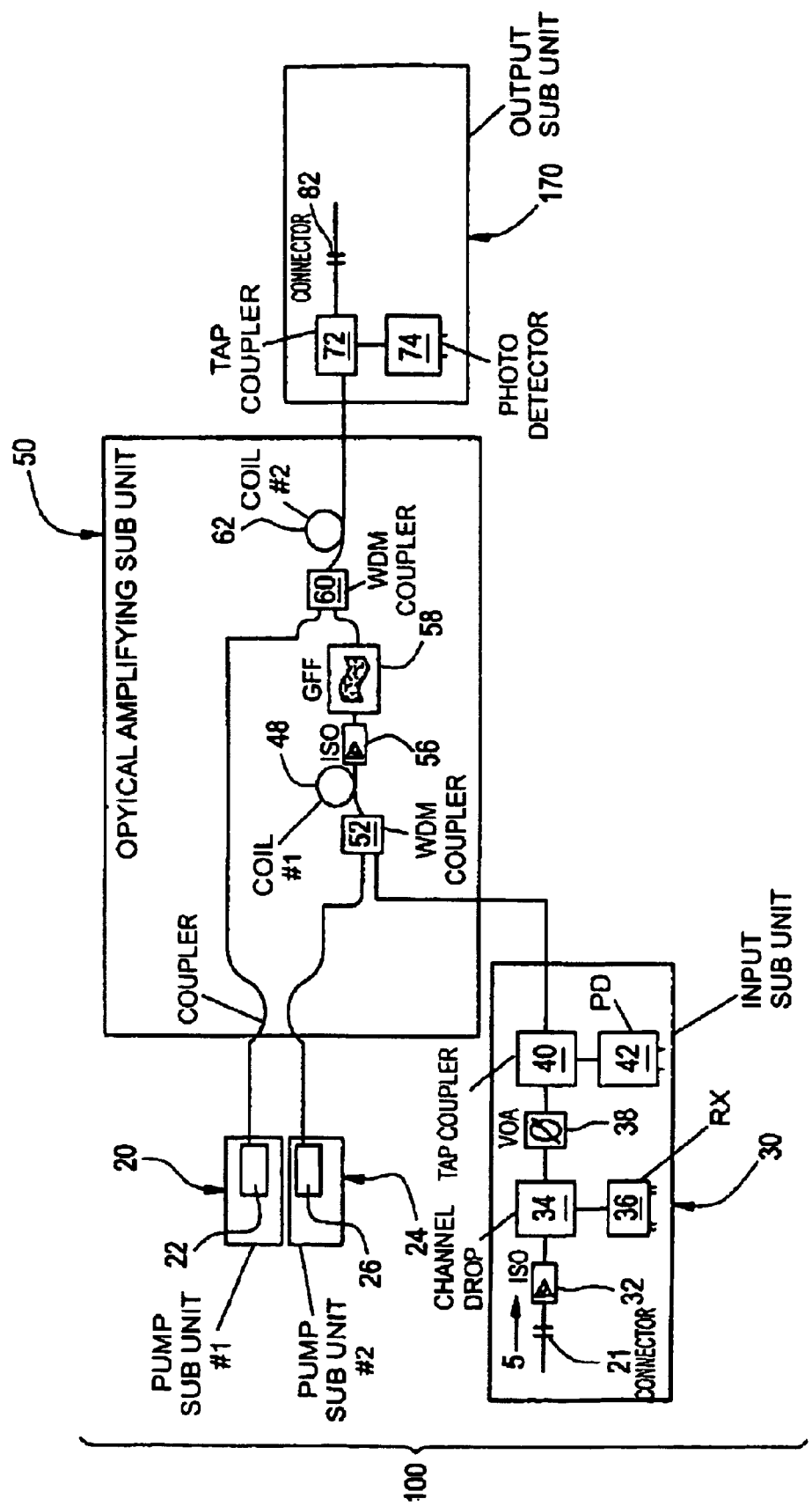
Figure 7:
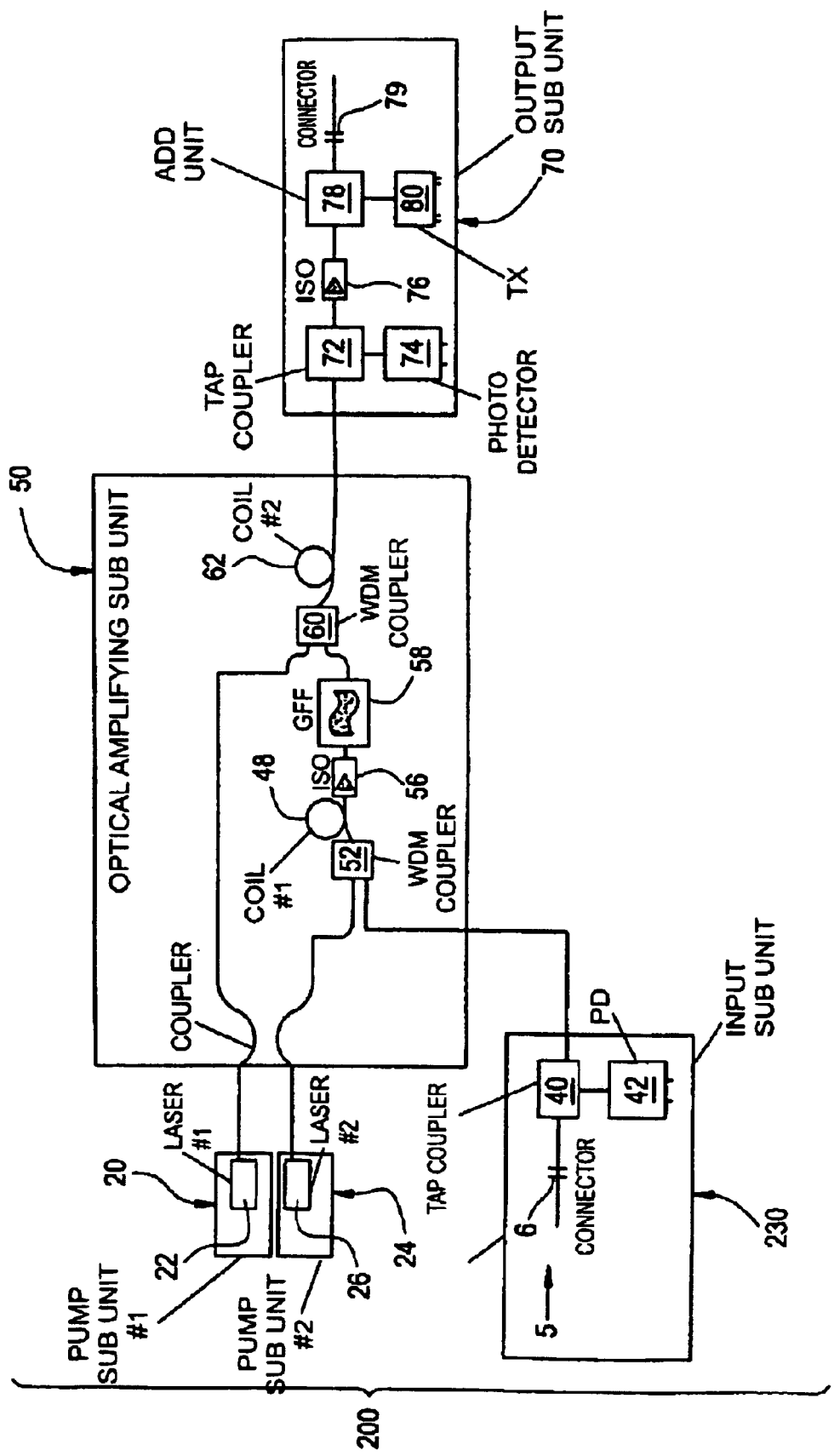

Turning to the drawings, FIGS. 1–4 diagrammatically illustrate the optical components that comprise each of the four optical amplifiers 10, 100, 200 and 300, respectively. FIGS. 5–8 each diagrammatically divides each of the four optical amplifiers 10, 100, 200 and 300, respectively, into the four functional groups of optical components, namely, pump components, input components, optical signal amplifying components and output components and shows each of the four functional groups mounted on separate sub-units. Turning to FIG. 5, the amplifier 10 is divided into the pump sub-units, 20 and 24, the input sub-unit 30, the output sub-unit 70 and the optical signal amplifying sub-unit 50. Similarly, FIG. 6 divides the amplifier 100 into the pump sub-units 20 and 24, the input sub-unit 30, the output sub-unit 170 and the optical signal amplifying sub-unit 50. FIG. 7 divides the amplifier 200 into the pump sub-units 20 and 24, the input sub-unit 230, the output sub-unit 70 and the optical signal amplifying sub-unit 50. Finally, FIG. 8 divides the amplifier 300 into the pump sub-units 20 and 24, the input sub-unit 30, the output sub-unit 170 and the optical signal amplifying sub-unit 350.

Comparing the pump sub-units 20 and 24, as shown in FIGS. 5–8, each of the four optical fiber amplifiers are constructed using both of the pump sub-units 20 and 24. In a preferred embodiment, the pump sub-unit 20 has a pump laser 22 that has an output wavelength $\lambda_1$ and the pump sub-unit 24 has a pump laser 26, which has an output wavelength $\lambda_1$ or, alternatively, has a different output wavelength $\lambda_2$.

Next, comparing each of the input sub-units 30 and 230 used in the four optical amplifiers shown in FIGS. 5–8, the input sub-unit 230 (shown in FIG. 7) differs from the input sub-unit 30 (shown in FIGS. 5, 6 and 8) in that input sub-unit 230 comprises a subset of the input components mounted on the input sub-unit 30. In particular, the input sub-unit 30 (shown in FIGS. 5, 6 and 8) comprises in the direction of an optical signal transmission (shown by arrow 5) a second optical isolator 32 that is serially connected to a supervisory channel drop unit 34. Further, a receiver 36 also is serially connected to the supervisory channel drop unit 34, which in turn is serially connected to a variable optical attenuator 38. A first tap coupler 40 is serially connected to the variable optical attenuator 38 and a first photodetector 42 is serially connected to the variable optical attenuator 38. On the other hand, the input sub-unit 230 (shown in FIG. 7) only comprises in the direction of the optical signal transmission (shown by arrow 5) a first tap coupler 40 and a first photodetector 42 that is serially connected to the tap coupler 40.

Similarly, the output sub-unit 170 (shown in FIGS. 6 and 8) comprises a subset of the output components mounted on the output sub-unit 70 shown in FIGS. 5 and 7. In particular, the output subunit 70 comprises in the direction of the optical signal transmission a second tap coupler 72 that is serially connected to a second photodetector 74. Further, the second tap coupler 72 is serially connected to a third optical isolator 76 which in turn is serially connected to a supervisory channel add unit 78, Finally, a transmitter 80 is serially connected to the supervisory channel add unit 78. On the other hand, the output sub-units 170 (shown in FIGS. 6 and 8) each comprises in the direction of the optical signal transmission only a second tap coupler 72 and a second photodetector 74 that is serially connected to the second tap coupler 72.

Figure 8:
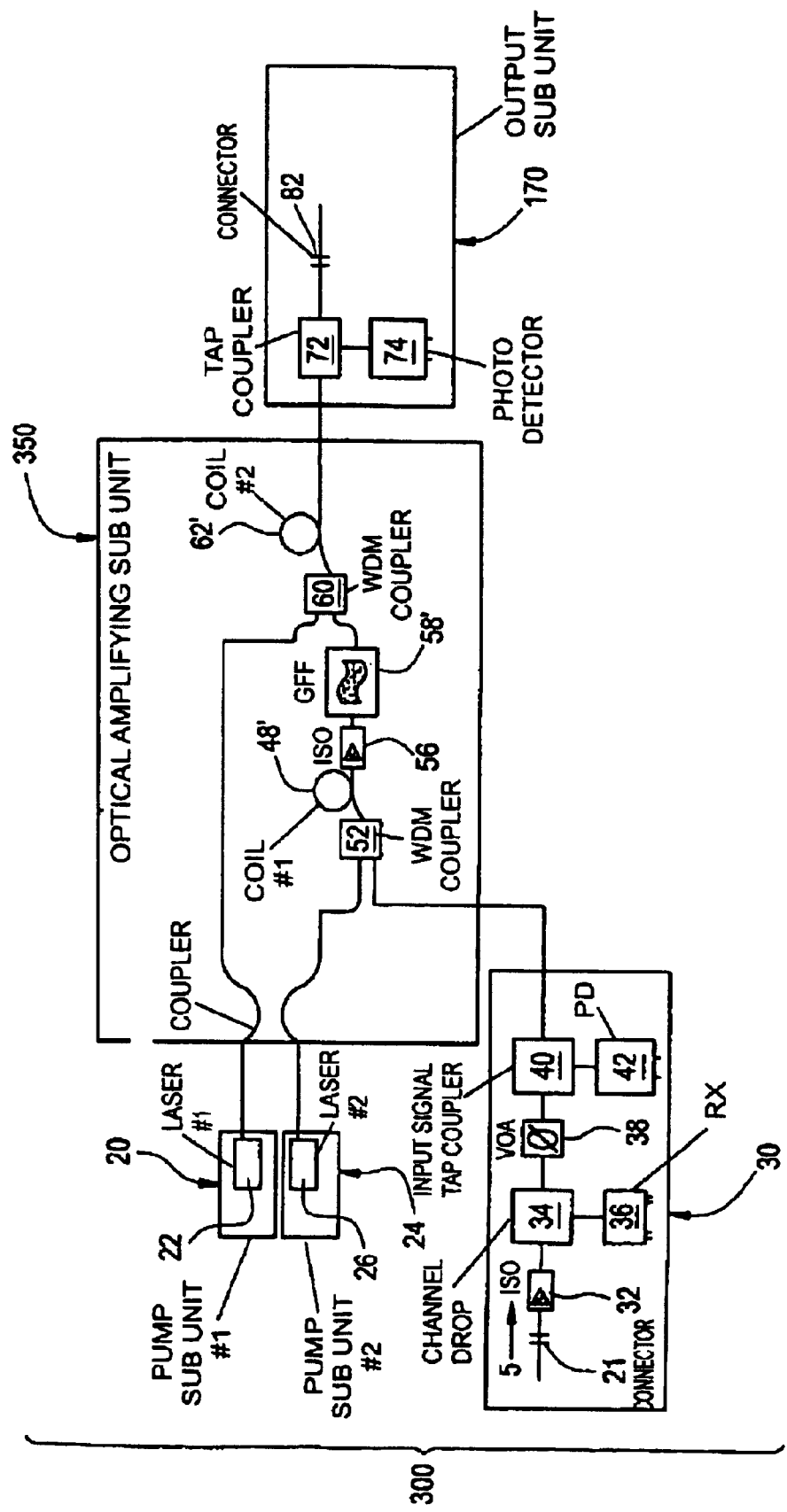

Further, the optical signal amplifying sub-unit 350 (shown in FIG. 8) differs from the optical signal amplifying sub-unit 50 (shown in FIGS. 5–7) in two ways given that each of the optical signal amplifying sub-unit 350 and 50 are used to construct a specific type of amplifier, each having a different net gain. First, the lengths of each of the respective first and second rare-earth doped optical fiber coils 48' and 62' on the optical signal amplifying sub-unit 350 is different from the lengths of the respective first and second rare-earth doped optical fiber coils 48 and 62 on the optical signal amplifying sub-unit 50. Second, the gain flattening filter 58' of the optical signal amplifying sub-unit 350 in FIG. 8 is different than the gain flattening filter 58 of the optical signal amplifying sub-unit 50. The remainder of the optical components on each of the optical signal amplifying sub-units 50 and 350 are the same. Accordingly, the optical signal amplifying sub-unit 50 (shown in FIGS. 5–7) comprises in the direction of the optical signal transmission a first wavelength-division multiplexing coupler 52 serially connected to a first rare-earth doped optical fiber coil 48, where the first rare-earth doped optical fiber coil 48 is serially connected to a first optical isolator 56. Further, the first optical isolator 56 is serially connected to a gain flattening filter 58, where the gain flattening filter 58 is serially connected to a second wavelength-division multiplexing coupler 60. The second wavelength-division multiplexing coupler 60 in turn is serially connected to a second rare-earth doped optical fiber coil 62. Similarly, the optical signal amplifying sub-unit 350 (shown in FIG. 8) comprises in the direction of the optical signal transmission a first wavelength division multiplexing coupler 52 that is serially connected to a first rare-earth doped optical fiber coil 48', where the first rare-earth doped optical fiber coil 48' is serially connected to a gain flattening filter 58', where the gain flattening filter 58' is serially connected to a second wavelength division multiplexing coupler 60. The second wavelength division multiplexing coupler 60 in turn is serially connected to a second rare-earth doped optical fiber coil 62'.

Figure 9:
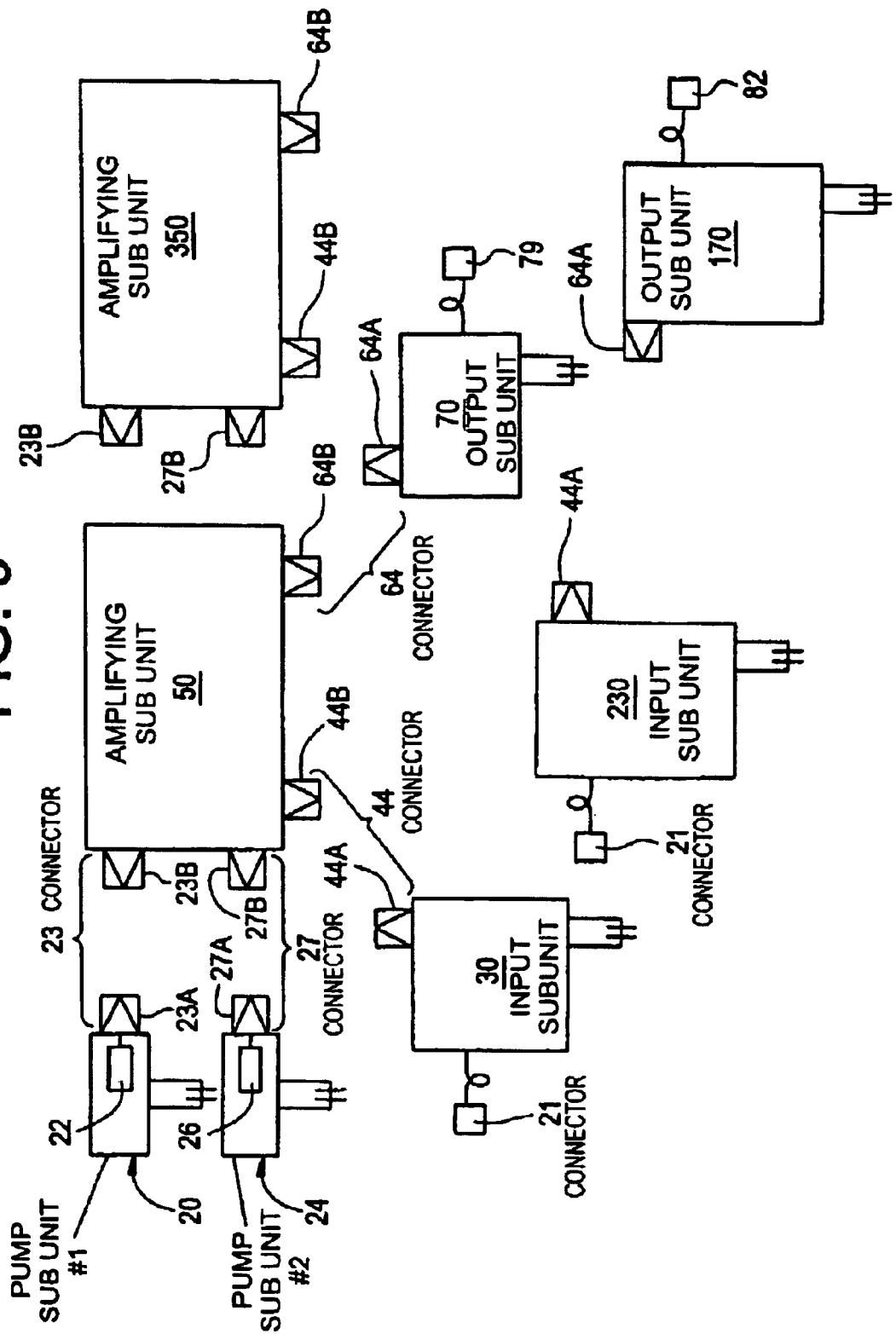
FIG. 9 is a schematic illustration of the different functional pluggable sub-units incorporating pluggable board mountable connectors that can be used to construct any one of the four amplifiers of FIGS. 1–4.

FIG. 9 schematically depicts each of the eight pluggable sub-units that are used in constructing the four optical amplifiers of the present invention. The elements shown in FIG. 9 are not drawn to scale, but are merely representative of the basic structure. The various optical components mounted on each of the pluggable sub-units have been omitted for convenience purposes. In particular, FIG. 9 shows a half member of a pluggable board mountable fiber-optic connector that is mounted on each of the eight sub-units of the present invention. Basically, each pluggable board mountable fiber-optic connector is made up of two mating half members such that when the two half members are mated together an optical connection is formed. Each of the pluggable board mountable fiber-optic connectors need not be positioned as shown in FIG. 9, as long as the respective mating half members are positioned for proper engagement. As shown in FIG. 9, the pump sub-unit 20 has mounted on an edge a first-half member 23A of a pluggable fiber-optic connector 23 that is adapted for mating with a corresponding second-half member 23B mounted on each of the optical signal amplifying sub-units 50 and 350, respectively. Each of the second-half members 23B of the fiber-optic connector 23 on both the optical signal amplifying sub-units 50 and 350 is identical and thus are assigned the same number. The first-half member 23A together with either of the second-half members 23B form the pluggable fiber-optic connector 23. Similarly, the pump sub-unit 24 has mounted on an edge a first-half member 27A that is adapted for mating with a corresponding second-half member 27B mounted on each of the optical signal amplifying sub-units 50 and 350, respectively. Again, since each of the second-half members 27B of the fiber-optic connector 27 on both the optical signal amplifying sub-units 50 and 350 is identical, they are assigned the same number. The first-half member 27A together with either of the second-half members 27B forms the pluggable fiber-optic connector 27. Further, each of the respective input sub-units 30 and 230 has mounted on an edge a first-half member 44A of a pluggable fiber-optic connector 44 that is adapted for mating with a corresponding second-half member 44B mounted on each of the optical signal amplifying sub-units 50 and 350, respectively. Finally, each of the respective output sub-units 70 and 170 has mounted on an edge a first-half member 64A of a pluggable fiber-optic connector 64 that is adapted for mating with a corresponding second-half member 64B mounted on each of the optical signal amplifying sub-units 50 and 350, respectively. Each of the respective first-half members 44A and 64A mounted on the input sub-units 30 and 230 are identical in construction and so are the respective second-half members 44B and 64B of the fiber-optic connectors 44 and 64 mounted on the optical signal amplifying sub-units 50 and 350, respectively.

Of significance, is the type of single-mode optical fiber used in the various optical components, since any splice between two optical fibers emanating from two optical components can lead to a high optical signal loss. In order to minimize signal loss, the type of optical fiber used, for instance, in a pump component is a consideration factor in selecting the type of optical fiber used in the construction of the pluggable optical connectors as well as the optical components downstream in the direction of a transmission signal. Basically, there are many types of single-mode fibers that are used in the telecommunication networks. Typically, the standard single-mode fiber widely used for telephony, cable television, submarine, and private network applications in the transmission of data, voice and/or video services is a single-mode fiber that is optimized for use in the 1310 nm wavelength region. This type of a single-mode fiber is referred to in this application as a 1310 nm optimized or as a standard 1310 nm single-mode fiber. Another type of single-mode fiber is one that is designed for use with a 980 nm pump laser used in Erbium-doped optical fiber amplifiers. This type of single-mode fiber does not contain the element Erbium, but is otherwise similar in optical characteristics to an Erbium-doped optical fiber. Such a single-mode fiber is referred to in this application as a specialty single-mode fiber. Such specialty single-mode fiber is designed with a small mode-field diameter that is similar to an Erbium-doped fiber to allow for efficient coupling between the pump fiber and the Erbium-doped fiber.

FIGS. 10–13 point out the particular optical fiber splices between each of the optical components mounted on the individual sub-units for each of the four amplifiers 10, 100, 200 and 300. Basically, the construction and arrangement of any two optical components in a given sub-unit is such that a low-loss and a high strength splice is created. Moreover, each splice between any two optical components falls into one of five categories. The first is a splice between two standard 1310 nm single-mode optical fibers. The second type is a splice between two specialty single-mode optical fibers. The third is a splice between a rare-earth doped optical fiber, preferably, erbium fiber and a specialty single-mode optical fiber. The fourth is a splice between a rare-earth doped optical fiber, preferably, erbium fiber and a standard 1310 nm single-mode fiber, and the fifth is a splice between a specialty single-mode fiber and a standard 1310 nm single-mode optical fiber. Typically, the signal loss due to an optical splice between two standard single-mode fibers is approximately between 0.02 dB and 0.05 dB, whereas, the signal loss due to an optical splice between two specialty single-mode fibers is approximately between 0.05 to 0.1 dB. Moreover, the signal loss due to an optical splice between a specialty single-mode fiber and an erbium fiber is approximately between 0.05 to 0.1 dB, whereas, the signal loss due to an optical splice between an erbium fiber and a single-mode fiber is approximately 0.1 dB. Finally, the loss due to an optical splice between a specialty single-mode fiber and a standard 1310 nm single-mode fiber is approximately between 0.08 and 0.15 dB.

Referring to FIGS. 10–13, when each of the chosen pump lasers 22 and 26 on the respective pump sub-units 20 and 24 is a 980 nm pump laser, the pluggable fiber-optic connectors 23 and 27 are both constructed with a specialty single-mode fiber. Alternatively, when each of the pump lasers 22 and 26 on sub-units 20 and 24, respectively, is a 1480 nm pump laser, the pluggable fiber-optic connectors 23 and 27 are both constructed with a standard 1310 nm single-mode fiber. Furthermore, when one of the pump lasers for instance, pump laser 22 is a 980 nm pump laser and the other pump laser 26 is a 1480 nm pump laser, optical connector 23 is constructed with the specialty single-mode fiber, whereas, optical connector 27 is constructed with the 1310 nm optimized single-mode fiber. Accordingly, in a preferred embodiment, if each of the pump lasers 22 and 26 has an output wavelength of 980 nm, each of the respective first-half members 23A and 27A and the respective second-half members 23B and 27B of the respective pluggable fiber-optic connectors 23 and 27 is constructed with a specialty single-mode optical fiber. However, if each of the pump lasers 22 and 26 has an output wavelength of 1480 nm, each of the respective first-half members 23A and 27A and the respective second-half members 23B and 27B of the respective pluggable fiber-optic connectors 23 and 27 is constructed with a standard single-mode optical fiber. In yet another embodiment, if one of the pump sources, for instance pump laser 22 has an output wavelength of 980 nm and if pump laser 26 has an output wavelength of 1480 nm, then the first-half member 23A and the second-half member 23B of the pluggable fiber-optic connector 23 is constructed with a specialty single-mode optical fiber, whereas, the first-half member 27A and the second-half member 27B of the pluggable fiber-optic connector 27 is constructed with a standard single-mode optical fiber.

Figure 10:
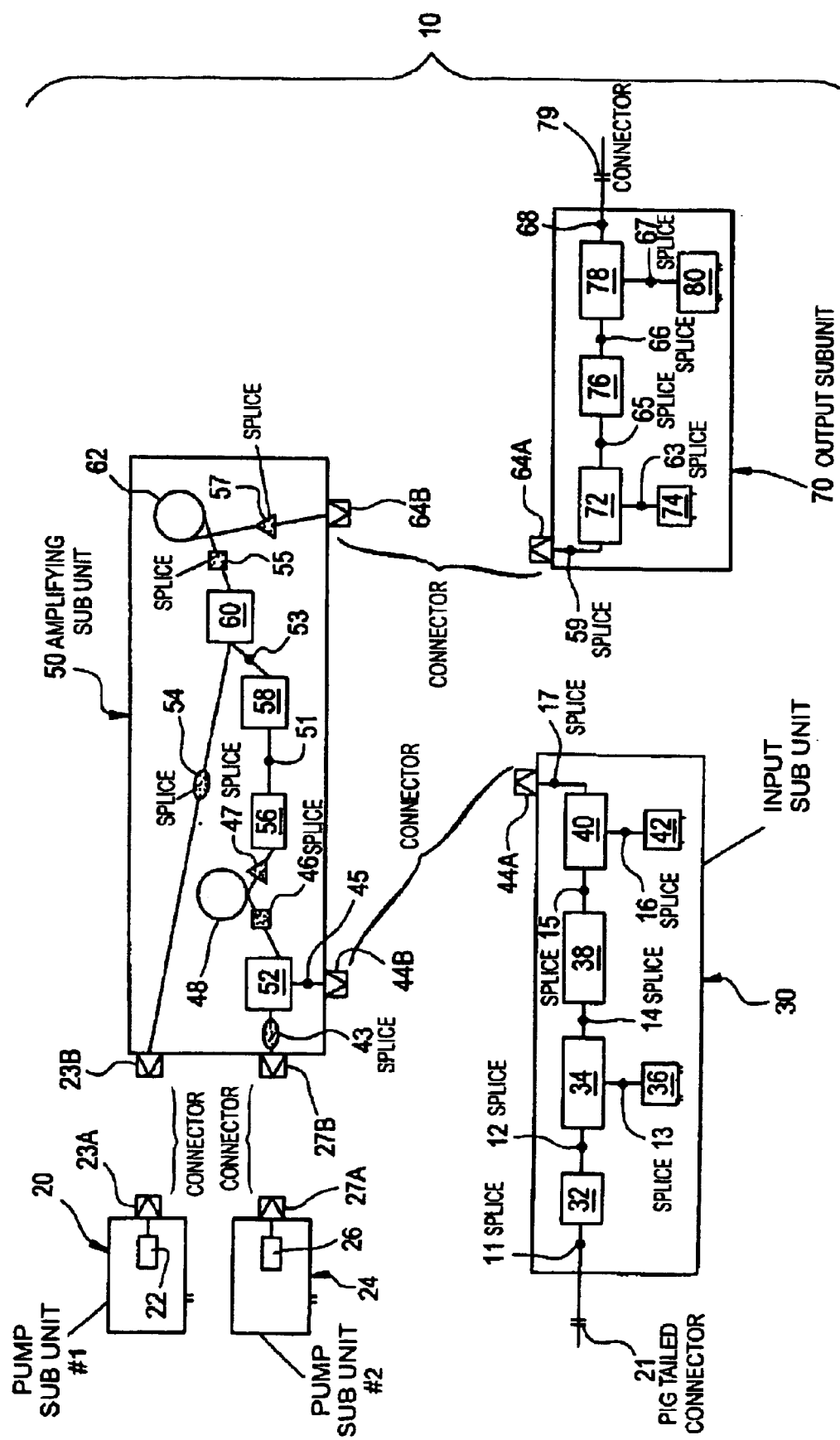
FIG. 10 is a schematic illustration of the multi-channel line amplifier of FIG. 1 showing the various d dissimilar fiber splices in accordance with the present invention.

Referring to the optical signal amplifying sub-unit 50 of amplifier 10 shown in FIG. 10, each of the splices 43, 45, 51, 53 and 54 are between optical components constructed with the same type of optical fiber, whereas, splices 46, 47, 55 and 57 are between optical components constructed with different optical fibers. As shown in FIGS. 10–13, the dot symbol represents a splice between two standard 1310 nm single-mode optical fibers, whereas, the ellipse symbol represents a splice that is either between two standard 1310 nm single-mode fiber or tow specialty single-mode optical fibers. Further, the triangle symbol represents a splice between an Erbium-doped fiber and a standard single-mode optical fiber or a splice between an Erbium-doped fiber and a specialty single-mode fiber. Moreover, the square symbol represents a splice between an Erbium-doped fiber and a specialty single-mode fiber. In particular, if each of the second-half members 23B and 27B of the respective optical connectors 23 and 27 is constructed with a specialty single-mode fiber (for instance, where both pump sources 22 and 26 are pump lasers having an output wavelength of 980 nm), then an input end of each of the respective wavelength-division multiplex couplers 60 and 52 is also constructed with a specialty single-mode fiber, thus, making each of splices 54 and 43 a low-loss and a high-strength splice between two specialty single-mode optical fibers. However, if each of the second-half members 23B and 27B of the respective optical connectors 23 and 27 is constructed with a standard single-mode fiber (for instance, where both pump sources 22 and 26 are pump lasers having an output wavelength of 1480 mm), then the input end of each of the respective wavelength-division multiplexing couplers 60 and 52 is also constructed with a standard single-mode fiber, thus, making each of splices 54 and 43 a low-loss splice between two standard single-mode optical fibers. Alternatively, if the first-half member 23A is constructed with a specialty single-mode optical fiber where pump laser 22 has a pump wavelength of 98 nm, then the second-half member 23B and an input end of wavelength-division multiplexing coupler 60 is constructed with a specialty single-mode optical fiber, whereas, if the first-half member 23B is constructed with a standard single-mode optical fiber (where pump laser 26 has a pump wavelength of 1480 nm) then the second-half member and an input end of the wavelength-division multiplexing coupler 52 is constructed with a standard single-mode optical fiber. In either event, splice 45 is a low-loss and a high-strength splice between a second input end of the wavelength-division multiplexing coupler 52 that is constructed with a standard 1310 nm single-mode optical fiber and the second-half member 44B of the fiber-optic connector 44 that is also constructed with a standard 1310 nm single-mode optical fiber. If splice 43 is a low-loss and a high-strength splice between two specialty single-mode fibers, then the output end of the wavelength-division multiplexing coupler 52 is constructed with a specialty single-mode fiber and splice 46 is a low-loss and a high-strength optical splice between a specialty optical fiber and a rare-earth doped optical fiber coil 48, preferably the optical fiber coil 48 being doped with erbium. If splice 43 is a low-loss and a high-strength splice between two standard single-mode fibers, then splice 46 is a splice between a standard single-mode fiber and the erbium doped fiber coil 48. Splice 47 is a low-loss and a high strength splice between the erbium-doped optical fiber coil 48 and the input end of the optical isolator 56, that is constructed with either a specialty or a standard 1310 nm single-mode fiber. Optical splice 51 is between the output end of the optical isolator 56 and the input end of the gain flattening filter 58, where the output end of the optical isolator 56 and the input end of the gain flattening filter 58, each is preferably constructed with a standard 1310 nm single-mode optical fiber. Alternatively, the output end of the isolator 56 and the input end of the gain flattening filter be constructed with a specialty single-mode fiber, which would still provide a low-loss for splice 51. Further, splice 53 is between the output end of the gain flattening filter 58 and a second input end of the wavelength-division multiplexing coupler 60, where both parts are constructed preferably with a standard 1310 nm single-mode optical fiber. Moreover, splice 54 is a low-loss and a high strength splice between the second-half member 23B of the fiber-optic connector 23 and a first input end of the wavelength-division multiplexer 60, where preferably each part is constructed with the same type of optical fiber. For instance, if the second-half member 23B is constructed with standard single-mode fiber, then the first input end of the wavelength-division multiplexing coupler 60 is also constructed with a standard single-mode fiber. However, if the second-half member 23B is constructed with a specialty single-mode optical fiber, then the first input end of the wavelength-division multiplexing coupler 60 is also constructed with a specialty single-mode optical fiber. Furthermore, splice 55 is between the output end of the wavelength-division multiplexer 60 constructed with a specialty optical fiber, and the input end of the rare-earth doped fiber coil 62, preferably an erbium doped fiber coil. Finally, splice 57 is between the output end of the rare earth doped optical fiber coil 62 constructed preferably with erbium doped fiber and the second-half member 64B of the fiber-optic connector 64, which is constructed with either a standard 1310 nm or a specialty single-mode optical fiber.

The construction of the second-half member 64B parallels the construction of the first-half member 64A on the output sub-unit 70. If the second-half member 64B is constructed with a standard 1310 μm single-mode optical fiber, then the first-half member 64A is constructed also with a standard 1310 nm single-mode optical fiber and the input end of the second tap coupler 72 is also constructed with a standard 1310 nm single-mode optical fiber. This results in splice 59 being a low-loss and a high-strength splice between two standard 1310 nm single-mode fibers. Alternatively, if the second-half member 64B is constructed with a specialty single-mode optical fiber, then the first-half member 64A also is constructed with a specialty optical fiber and the input end of the second tap coupler 72 is also constructed with a specialty optical fiber. In which case, splice 59 is a low-loss and a high-strength splice between two specialty single-mode fibers. Further, the splices 63, 65–68 on sub-unit 70 are each formed between optical components constructed with a standard 1310 nm single-mode optical fiber. Moreover, splice 68 is a splice between the supervisory channel add unit 78 and a second pigtailed connector 79, where both the supervisory channel add unit 68 and the second pigtailed connector 79 are constructed with a standard 1310 nm single-mode optical fibers.

Referring to the optical splices on the input sub-unit 30 of amplifier 10 shown in FIG. 10, the input end of the optical isolator 32 is optically spliced to a pigtailed connector 21 via splice 11 and the output end of the optical isolator 32 is spliced to the input end of the supervisory channel drop unit 34 via splice 12. In order to minimize the optical signal loss caused by splices 11 and 12, the pigtailed connector 21, the optical isolator 32 and the supervisory channel drop unit 34, each is constructed with the same type of optical fiber. Similarly, splices 13–17 are splices between optical components constructed with the same type of optical fiber. More specifically, the receiver 36, the variable optical attenuator 38, the first tap coupler 40, the first photodetector 42, and the first-half member 44A of the fiber-optic connector 44, each is constructed with the same type of optical fiber as the optical isolator 32 and the supervisory channel drop unit 34. In a preferred embodiment, each of the respective optical components mounted on the input sub-unit 30 is constructed with a standard 1310 nm single-mode fiber.

Next, turning to the amplifier 100 shown in FIG. 11, the input sub-unit 30 and the optical signal amplifying sub-unit 50 are identical in construction to that of the amplifier 10 of FIG. 10, described herein above. Thus, only the splices of the output sub-unit 170 will be described in detail. In particular, splice 59 is between the first-half member 64A of the fiber-optic connector 64 and the input end of the second tap coupler 72. If the second-half member 64B of the optical signal amplifying sub-unit 50 is constructed with a specialty single-mode optical fiber, then the first-half member 64A is also constructed with a specialty optical fiber and the input end of the second tap coupler 72 is also constructed with a specialty optical fiber, in which case, splice 59 is a low-loss and a high strength splice between two specialty single-mode fibers. Alternatively, if the second-half member 64B is constructed with a standard 1310 nm single-mode optical fiber, then both the first-half member 64A and the input end of the second tap coupler 72 are constructed with a standard 1310 nm single-mode optical fiber, in which case, splice 59 is a low-loss and a high strength splice between two standard 1310 m single-mode fibers. Further, the output end of the second tap coupler 72 is spliced to the second photodetector 74, where the splice 63 is between standard 1310 nm single-mode optical fibers. Finally, splice 81 splices the output end of the second tap coupler 72 to a pigtailed connector 82, where each is constructed with a standard 1310 nm single-mode optical fiber.

Figure 12:
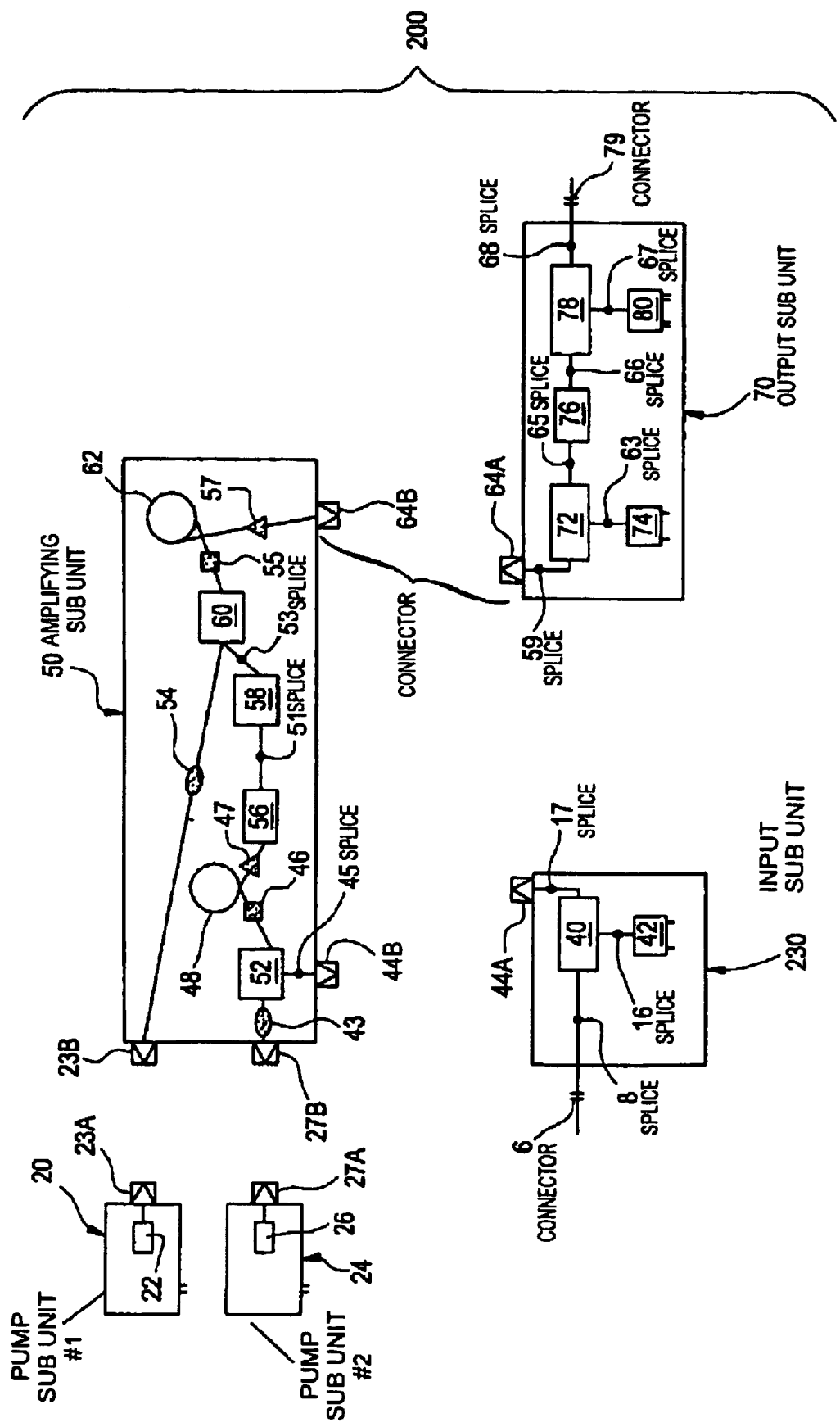
FIG. 12 is a schematic illustration of the multi-channel output amplifier of FIG. 3 showing the various similar and dissimilar fiber splices in accordance with the present invention.

Turning to the amplifier 200 of FIG. 12, the optical signal amplifying sub-unit 50 and the output sub-unit 70 are identical in construction to the sub-units of the amplifier 10 of FIG. 10, thus, only the splices of the input sub-unit 230 will be described in detail. The input end of the first tap coupler 40 is spliced to a pigtailed connector 6 via splice 8, which is a splice between standard 1310 nm single-mode optical fibers. Further, the first tap coupler 40 is spliced to the first photodetector 42 via splice 16, and the output end of the first tap coupler 40 is spliced to the first-half member 44A of the fiber-optic connector 44 via splice 17. Both splices 16 and 17 are between standard 1310 nm single-mode optical fibers.

Figure 11:
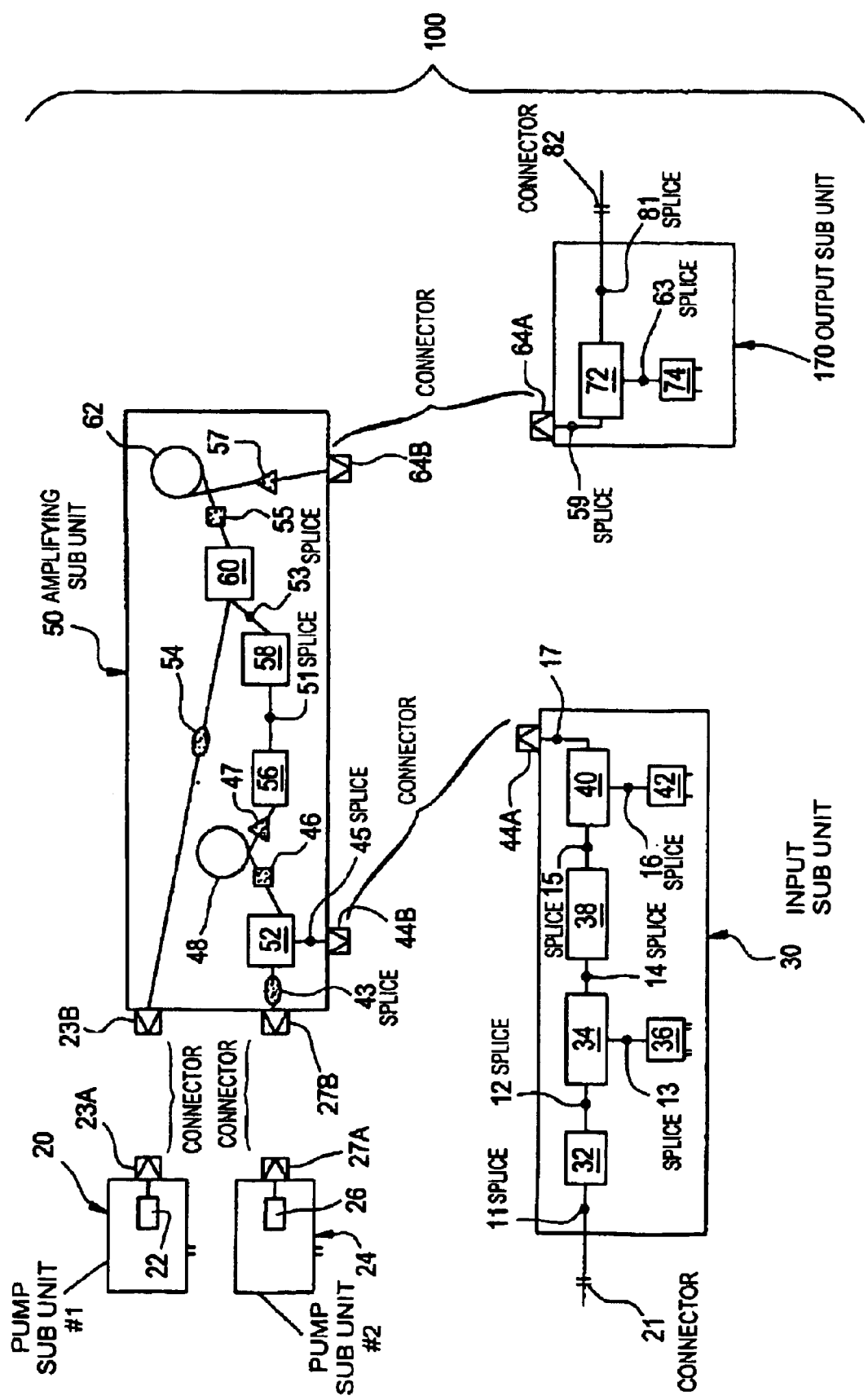
FIG. 11 is a schematic illustration of the multi-channel input amplifier of FIG. 2 showing the various similar and dissimilar fiber splices in accordance with the present invention.
Figure 13:
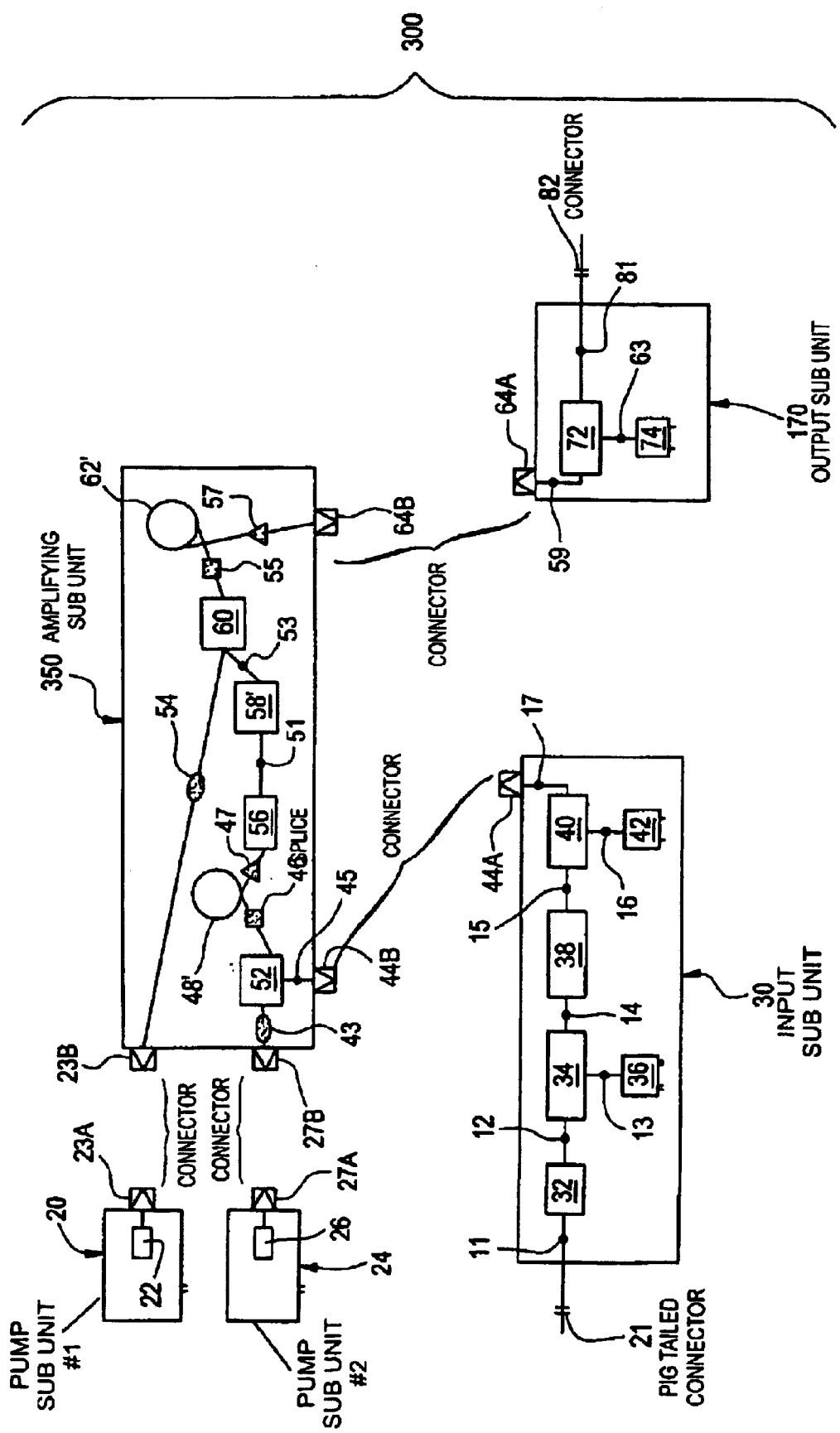
FIG. 13 is a schematic illustration of the multi-channel input amplifier of FIG. 4 showing the various similar and dissimilar fiber splices in accordance with the present invention.

Turning to the amplifier 300 of FIG. 13, the input sub-unit 30 and the output sub-unit 170 are identical in construction to that of the input and output sub-units 30 and 170 of the amplifier 100 shown in FIG. 11. Moreover, the splices on the optical signal amplifying subunit 350 are identical to those of the optical signal amplifying sub-unit 50. However, the optical signal amplifying sub-unit 350 of FIG. 13 is different from the optical signal amplifying sub-unit 50 of FIGS. 10–12 in two ways that, in essence, provides a way to construct an amplifier with a different net gain. First, each of the respective first and second rare-earth doped optical fiber coils 48' and 62' of the optical signal amplifying sub-unit 350 shown in FIG. 13 vary in length from the respective rare-earth doped optical fiber coils 48 and 62 of the optical amplifiers shown in FIGS. 10–12. Second, the gain flattening filter 58! of the optical signal amplifying sub-unit 350 is different from the gain flattening filter 58 of the optical signal amplifying sub-unit 50. Aside from these two differences, the optical signal amplifying sub-units 50 and 350 are essentially identical in construction.

Accordingly, the invention provides optical interfaces between any two of the desired sub-units that are selected to be optically connected such that the optical interfaces result in a low-loss and a high-strength optical connection. Furthermore, the invention provides optical splices between individual optical components mounted on the respective sub-units that are of a low-loss and a high-strength type. In addition, the invention provides a method of switching from making one optical fiber amplifier to making any one of the four optical fiber amplifiers by simply substituting one pluggable sub-unit for another. Moreover, the invention provides a method of assembling any one of the four optical amplifiers, whereby the individual sub-units can be tested prior to 110 being assembled in an amplifier. In this manner, if any of the sub-units do not meet the required standards, the sub-unit can be discarded ever before it is assembled into the amplifier unit, thus, preventing failure in the final assembled amplifier unit. All these advantages of the invention save time and reduce the overall cost of manufacturing an optical fiber amplifier.

In a preferred embodiment, amplifier 10 is a line amplifier having a net gain of 13 dB, amplifier 100 is an input amplifier having a net gain of 14 dB, amplifier 200 is an output amplifier having a net gain of 14 dB and amplifier 300 is a line amplifier having a net gain of 9 dB. Also, in a preferred embodiment, the first tap coupler 40 is a 2% tap coupler, whereas, the second tap coupler 72 is a 1% tap coupler.

Furthermore, in a preferred embodiment, each of the pump sub-units 20 and 24 is a detachable plug-in pump laser card assembly that is described in the commonly owned U.S. provisional application Ser. No. 60/110,633, filed on Dec. 2, 1998, the specification of which is hereby incorporated by reference. Briefly, the detachable plug-in pump laser card assembly comprises: a printed circuit board, a heat sink, a pump laser, a first-half plug-in member of an optical connector, a second-half plug-in member of an electrical connector and a reel having an optical fiber wrapped there around. The heat sink is substantially parallel to the printed circuit board and is separated from the printed circuit board by spacers. The pump laser is connected to one side of the heat sink, which has a plurality of fins on an opposite side from where the pump laser is connected. The first-half plug-in member of the optical connector and the second-half plug-in member of the electrical connector are each secured to the printed circuit board and are located at an insertion end of the pump laser card assembly. The reel is disposed between the printed circuit board and the heat sink and the optical fiber wrapped around the reel has a first end connected to the pump laser and a second end connected to the first-half plug-in member of the optical connector. The detachable plug-in pump laser card assembly is plugged into a port located on a base plate of the optical fiber amplifier, where the first-half plug-in member of the optical connector optically engages with a mating member and where the second-half plug-in member of the electrical connector electrically engages with a mating member.

Also, in a preferred embodiment of the invention, the method of making a low loss splice between an erbium doped fiber and a single-mode optical fiber is described in the U.S. provisional application Ser. No. 60/101,888, filed on Sep. 25, 1998, the specification of which is hereby incorporated by reference.

Moreover, in the preferred embodiment, the rare earth doped optical fiber coils 48, 62, 48' and 62' each is an erbium doped optical fiber coil, commercially available from Lucent Technologies and Alcatel N.V. Further, the optical amplifiers of the present invention are designed to amplify an optical transmission signal that has a wavelength in the range of about 1525 to 1610 nanometers. In a preferred embodiment, where both pump lasers 22 and 26 each has an output wavelength of 980 rn, the two respective wavelength-division multiplexing couplers 60 and 52 are each a $980/1550$ single-mode wide-band wavelength-division multiplexing couplers, whereas, where both pump lasers 22 and 26 each has an output wavelength of 1480 nm, the two respective wavelength-division multiplexing couplers 60 and 52 are each a $1480/1550$ single-mode wide-band wavelength-division multiplexing couplers. Furthermore, in a preferred embodiment, where one pump laser 22 has an output wavelength of 980 nm and the second pump laser 26 has an output wavelength of 1480 nm, the wavelength-division multiplexing coupler 60 is a $980/1550$ single-mode wide-band wavelength-division multiplexing coupler, whereas, the second wavelength-division multiplexing coupler 52 is a $1480/1550$ single-mode wide-band wavelength-division multiplexer. The construction of each of the wavelength-division multiplexing couplers is described in the commonly owned and assigned U.S. Pat. No. 5,179,603 issued on Jan. 12, 1993, the specification of which is hereby incorporated by reference. Moreover, each of the pluggable board mountable optical connectors 23, 27, 44 and 64 are basically low loss ferrule type connectors, preferably, angled contact type connectors that are commercially available from Molex Inc. Besides providing low back reflection, such angled connectors also facilitate in the plugging and unplugging of the various sub-units while the optical fiber amplifier is still in operation. Further, the standard 1310 nm single-mode optical fiber used in the present invention is sold by Corning Incorporated under the brand name of SMF-28, which has a dual layer acrylate CPC6 coating. In addition, the specialty single-mode fiber is a fiber that does not contain the element erbium and has a mode field diameter matched to that of the erbium doped fiber. Finally, the two gain flattening filters and the remainder of the optical components used in the four optical amplifiers are well-known in the art and are generally commercially available in the market place.

Although a preferred embodiment of this invention has been described herein, various modifications and variations of the invention will be apparent to those skilled in the art without departing from the spirit or scope of the invention.

For instance, N optical fiber amplifiers each having N number of gain stages can be constructed in accordance with the invention described herein where N>1. Thus, it is intended that the present invention cover the modifications and variations of this invention provided they come within the scope of the appended claims and their equivalents.

What is claimed is:

1. An optical fiber assembly, comprising:
   a support board;
   a first pluggable sub-unit mounted onto said support board, said first pluggable sub-unit comprising a first pump source having a pump wavelength of $\lambda_1$;
   a second pluggable sub-unit mounted onto said support board, said second pluggable sub-unit comprising a plurality of first stage optical signal amplifying components;
   a third pluggable sub-unit mounted onto said support board, said third pluggable sub-unit comprising a plurality of input stage components; and
   a fourth pluggable sub-unit mounted onto said support board, said fourth pluggable sub-unit comprising a plurality of output stage components;
   said second pluggable sub-unit being optically connected to each of said first, third and fourth pluggable sub-units.

2. The optical amplifier assembly of claim 1, further comprising a first, third and fourth fiber-optic connector, wherein said second pluggable sub-unit is optically connected to each of said first, third and fourth pluggable sub-units via said first, third and fourth fiber-optic connector, respectively.

3. The optical amplifier assembly of claim 1, wherein said second pluggable sub-unit comprises a plurality of second stage optical signal amplifying components.

4. The optical amplifier assembly of claim 3, further comprising a fifth pluggable sub-unit mounted onto said support board, said fifth pluggable sub-unit having a second pump source that has a pump wavelength of $\lambda_2$ which is optically connected to said second pluggable sub-unit via a fifth board mountable fiber-optic connector.

5. The optical amplifier assembly of claim 4, wherein said plurality of first and second stage optical signal amplifying components comprises in a direction of an optical signal transmission a first wavelength-division multiplexing coupler serially connected to a first rare-earth doped optical fiber coil, said first rare-earth doped optical fiber coil being serially connected to a first optical isolator, said first optical isolator being serially connected to a gain flattening filter, said gain flattening filter being serially connected to a second wavelength-division multiplexing coupler, said second wavelength-division multiplexing coupler being serially connected to a second rare earth doped optical fiber coil.

6. The optical amplifier assembly of claim 4, wherein said pump wavelength $\lambda_1$ of said first pump source is approximately equal to said pump wavelength $\lambda_2$ of said second pump source.

7. The optical amplifier assembly of claim 4, wherein said pump wavelength $\lambda_1$ of said first pump source is different than that of said pump wavelength $\lambda_2$ of said second pump source.

8. The optical amplifier assembly of claim 6, wherein each of said pump wavelength $\lambda_1$ and $\lambda_2$ is approximately 980 nanometers.

9. The optical amplifier assembly of claim 7, wherein said pump wavelength $\lambda_2$ of said first pump source is 980 nanometers and wherein said pump wavelength $\lambda_2$ of said second pump source is 1480 nanometers.

10. An optical fiber amplifier assembly, comprising:
    a support board;
    a first pluggable sub-unit mounted onto said support board, said first pluggable sub-unit comprising a first pump source having a pump wavelength of $\lambda_1$;
    a second pluggable sub-unit mounted onto said support board, said second pluggable sub-unit comprising a plurality of first stage optical signal amplifying components and a plurality of second stage optical signal amplifying components;
    a third pluggable sub-unit mounted onto said support board, said third pluggable sub-unit comprising a plurality of input stage components; and
    a fourth pluggable sub-unit mounted onto said support board, said fourth pluggable sub-unit comprising a plurality of output stage components;
    said second pluggable sub-unit being optically connected to each of said first, third and fourth pluggable sub-units;
    a fifth pluggable sub-unit mounted onto said support board, said fifth pluggable sub-unit having a second pump source that has a pump wavelength of $\lambda_2$ and which is optically connected to said second pluggable sub-unit via a fifth board mountable fiber-optic connector, said pump wavelength $\lambda_2$ of said second source being different than that of said pump wavelength $\lambda_1$ of said first pump source wherein said plurality of input stage components comprises in said direction of said optical signal transmission a first tap coupler, and a first photodetector serially connected to said tap coupler.

11. The optical amplifier assembly of claim 10, wherein said plurality of input stage components further comprises in said direction of said optical signal transmission a second optical isolator serially connected to a supervisory channel drop unit, a receiver serially connected to said supervisory channel drop unit, a variable optical attenuator serially connected to said supervisory channel drop unit at a first end and to said first tap coupler at an opposite end.

12. The optical amplifier assembly of claim 11, wherein said plurality of output stage components comprises in said direction of said optical signal transmission:
    a second tap coupler, and a second photodetector serially connected to said second tap coupler.

13. The optical amplifier assembly of claim 12, wherein said plurality of output stage components further comprises in said direction of said optical signal transmission: a third optical isolator serially connected to said second tap coupler, a supervisory channel add unit serially connected to said third optical isolator and a transmitter serially connected to said supervisory channel add unit.

14. The optical amplifier assembly of claim 13, wherein each of said first, third, fourth and fifth board mountable fiber-optic connectors comprises a respective first-half member and a respective mating second-half member, each of said respective first-half members being mounted along an edge of each of said first, third, fourth and fifth pluggable sub-unit, respectively, and each of said respective mating second-half members being mounted along the edges of said second pluggable sub-unit.

15. A method of making an optical fiber amplifier comprising the steps of:
    providing a plurality of different pump sub-units, different optical signal amplifying sub-units, different input sub-units and different output sub-units;
    selecting one desired sub-unit from each of said plurality of different pump sub-units, different optical signal amplifying sub-units, different input subunits and different output sub-units;

optically connecting each of said desired pump, optical signal amplifying, input and output sub-units on a support board via a plurality of pluggable fiber optic connectors to make said optical fiber amplifier.

16. The method of claim 15, wherein said providing step includes the step of first providing a design for each of a first, second, third and fourth optical fiber amplifier, each of said first, second, third and fourth optical fiber amplifier comprising a plurality of optical components.

17. The method of claim 16, wherein said first providing step further includes: for each of said first, second, third and fourth optical fiber amplifier, dividing said plurality of optical components into at least four functional groups, including a pump components group, an optical signal amplifying components group, an input components group and an output components group, each of said functional groups comprising one or more optical components.

18. The method of claim 17, wherein said pump components group is further divided into a first pump components group and a second pump components group, said first pump components group including a first pump laser having an output wavelength of $\lambda_1$, said second pump components group including a second pump laser having an output wavelength of $\lambda_2$.

19. A method of making an optical fiber amplifier comprising the steps of:

providing a plurality of different pump sub-units, different optical signal amplifying sub-units, different input sub-units and different output sub-units, said providing step including the step of first providing a design for each of a first, second, third and fourth optical fiber amplifier, each of said first, second, third and fourth optical fiber amplifier comprising a plurality of optical components, wherein said first providing step further includes: for each of said first, second, third and fourth optical fiber amplifier, dividing said plurality of optical components into at least four functional groups, including a pump components group, an optical signal amplifying components group, an input components group and an output components group, each of said functional groups comprising one or more optical components;

selecting one desired sub-unit from each of said plurality of different pump sub-units, different optical signal amplifying sub-units, different input sub-units and different output sub-units;

optically connecting each of said desired pump, optical signal amplifying, input and output sub-units on a support board via a plurality of pluggable fiber optic connectors to make said optical fiber amplifier, further comprising the steps of:

forming an optical signal amplifying components group, an input components group and an output components group, wherein each of said optical signal amplifying, input and output components groups includes a maximum number of said optical components common to each of said first, second, third and fourth optical fiber amplifiers; and forming an optical signal amplifying components subset group, an input components subset group and an output components subset group, each of said components subset groups having the minimum number of said optical components common to each of said respective components groups for each of said first, second, third and fourth optical fiber amplifiers.

20. The method of claim 19, further comprising the steps of:

mounting each of said optical signal amplifying components group on one or more amplifying sub-units, mounting each of said input components group on one or more input sub-units, and mounting each of said output components group on one or more output sub-units;

mounting each of said optical signal amplifying components subset group on one or more amplifying sub-units, mounting each of said input components subset group on one or more input sub-units, and mounting each of said output components subset group on one or more output sub-units; and mounting each of said first pump components group and said second pump components group on a first pump sub-unit and a second pump sub-unit, respectively.

21. The method of claim 20, further comprising the step of:

arranging each of said optical signal amplifying, input and output components groups and each of said optical signal amplifying, input and output subset components groups on said respective sub-units such that an optical fiber splice between any two of said optical components provides a low-loss and a high strength splice.

22. The method of claim 21, wherein said step of optically connecting comprises:

mounting on an edge of each of said pump sub-units, each of said input sub-units, and each of said output sub-units a first-half member of a board mountable fiber-optic connector that is adapted for mating with a respective second-half member mounted on each of said optical signal amplifying sub-units.

23. The method of claim 22, wherein said optically connecting step further comprises the step of:

first determining which of said optical components on each of said optical signal amplifying, input and output sub-units utilize similar fibers and which of said optical components on each of said optical signal amplifying, input and output sub-units utilize different fibers for each of said first, second, third and fourth optical fiber amplifiers; and providing optical interfaces between said desired sub-units selected to be optically connected such that each of said optical interfaces provides a low-loss and a high-strength optical fiber splice.

24. The method of claim 23, wherein said step of optically connecting comprises mounting on each of said pump sub-units a first-half member of a first and a second board mountable fiber-optic connector, each first-half member having a first type of an optical fiber and mounting on each of said optical signal amplifying sub-units two second-half members of said first and said second board mountable fiber-optic connector, each second-half member being adapted for mating with said first-half members.

25. The method of claim 24, wherein said step of optically connecting comprises mounting on each of said input sub-units a first-half member of a third board mountable fiber-optic connector having a second type of an optical fiber and mounting on each of said optical signal amplifying sub-units a second-half member adapted for mating with said first-half member on said input sub-units.

26. The method of claim 25, wherein said step of optically connecting comprises mounting on each of said output sub-units a first-half member of a fourth board mountable fiber-optic connector that contains an optical fiber of said second type and mounting on each of said optical signal amplifying sub-units a second-half member adapted for mating with said first-half member on said output sub-units.

27. The method of claim 26, wherein said first optical fiber amplifier is a line amplifier.

28. The method of claim 26, wherein said second optical fiber amplifier is an input amplifier having a first net gain.

29. The method of claim 26, wherein said third optical fiber amplifier is an output amplifier.

30. The method of claim 26, wherein said fourth optical fiber amplifier is an input amplifier having a second net gain.

31. The method of making an optical fiber amplifier, comprising the steps of:

arranging on a first pluggable sub-unit a first pump source having a first pump wavelength of $\lambda_1$, said first pluggable sub-unit having mounted on an edge a first-half member of a first board mountable fiber-optic connector adapted for mating with a corresponding second-half member mounted on a first edge of a second pluggable sub-unit;

arranging on said second pluggable sub-unit a first group of optical components that effect each of a first signal amplifying stage, a second signal amplifying stage, and the gain flatness of said optical fiber amplifier, said first group of optical components providing said optical fiber amplifier with a first net gain, said second pluggable sub-unit having mounted on said first edge said second-half member of said first board mountable fiber-optic connector and said second sub-unit having mounted on a second edge a second-half member of each of a third and fourth board mountable fiber-optic connectors;

arranging on a third pluggable subunit a second group of optical components that effect an input stage of said optical fiber amplifier, said third pluggable sub-unit having mounted on an edge a first-half member of said third board mountable fiber-optic connector adapted for mating with said respective second-half member mounted on said second pluggable sub-unit;

arranging on a fourth pluggable sub-unit a third group of optical components that effect an output stage of said optical fiber amplifier, said fourth pluggable sub-unit having mounted on an edge a first-half member of said fourth board mountable fiber-optic connector adapted for mating with said respective second-half member mounted on said second pluggable sub-unit;

arranging on a fifth luggable sub-unit a second pump source having a second pump wavelength of $\lambda_2$, said fifth pluggable sub-unit having mounted on an edge a first-half member of a fifth board mountable fiber-optic connector adapted for mating with a corresponding second-half member mounted on said first edge of said second pluggable sum-assembly; and optically connecting each of said first, third, fourth and fifth pluggable sub-units into said second pluggable sub-unit via said respective first, third, fourth and fifth board mountable fiber-optic connectors to make said optical fiber amplifier.

32. The method of making an optical fiber amplifier, comprising the steps of:

arranging on a first pluggable sub-unit a first signal amplifying stage having a first pump wavelength of $\lambda_1$, said first pluggable sub-unit having mounted on an edge a first-half member of a first board mountable fiber-optic connector adapted for mating with a corresponding second-half member mounted on a first edge of a second pluggable sub-unit;

arranging on said second pluggable sub-unit a first group of optical components that effect each of a first signal amplifying stage, a second signal amplifying stage, and the gain flatness of said optical fiber amplifier, said first group of optical components providing said optical fiber amplifier with a first net gain, said second pluggable sub-unit having mounted on said first edge said second-half member of said first board mountable fiber-optic connector and said second sub-unit having mounted on a second edge a second-half member of each of a third and fourth board mountable fiber-optic connectors;

arranging on a third pluggable sub-unit a second group of optical components that effect an input stage of said optical fiber amplifier, said third pluggable sub-unit having mounted on an edge a first-half member of said third board mountable fiber-optic connector adapted for mating with said respective second-half member mounted on said second pluggable sub-unit arranging on a fifth pluggable sub-unit a second pump source having a second pump wavelength of $\lambda_2$, said fifth pluggable sub-unit having mounted on an edge a first-half member of a fifth board mountable fiber-optic connector adapted for mating with a corresponding second-half member mounted on said first edge of said second pluggable sum-assembly; and optically connecting each of said first, third, fourth and fifth pluggable sub-units into said second pluggable sub-unit via said respective first, third, fourth and fifth board mountable fiber-optic connectors to make said optical fiber amplifier, a sixth pluggable sub-unit which includes a fourth group of optical components that effect each of a first signal amplifying stage, and the gain flatness of said optical fiber amplifier, said fourth group of optical components providing said optical fiber amplifier with a second net gain, said sixth pluggable sub-unit having mounted on a first edge a second-half member of each of a first and fifth board mountable fiber-optic connectors and said sixth pluggable sub-unit having mounted on a second edge a second-half member of each of a seventh and eighth board mountable fiber-optic connectors;

a seventh pluggable sub-unit which includes a fifth group of optical components that effect an input stage of said optical fiber amplifier, said fifth group being a sub-set of said second group of optical components, said seventh pluggable sub-unit having mounted on an edge a first-half member of said seventh board mountable fiber-optic connector; and an eighth pluggable sub-unit which includes a sixth group of optical components that are shared in an output stage of said optical fiber amplifier, said sixth group being a sub-set of said third group of optical components; said eighth pluggable sub-unit having mounted on an edge a first-half member of said eighth board mountable fiber-optic connector;

whereby said first, fifth, seventh and eighth pluggable sub-units are optically connected to said sixth pluggable sub-unit via said respective first, fifth, seventh and eighth board mountable fiber-optic connectors to make a different optical fiber amplifier.

33. The method of claim 32, wherein said optical fiber amplifier comprises:

one of said second and sixth pluggable sub-units that is optically connected to at least one of said first and fifth pluggable sub-units, one of said third and seventh pluggable sub-units units and one of said fourth and eighth pluggable sub-units.

34. The method of claim 33, wherein each of said first, third, fourth, fifth, seventh and eighth board mountable fiber-optic connectors couple optical components constructed with similar optical fibers.

35. A method of making an optical fiber amplifier comprising the steps of:
  testing the pump power and pump wavelength of a pump module to be connected to an information signal to be amplified;
  if the desired pump power and pump wavelength are not present, rejecting said pump module for use in a larger assembly;
  if the desired pump power and pump wavelength are present, accepting said pump module for use in a larger assembly;
  assembling a signal input module having an input end to be connected to an information signal to be amplified and an output end that terminates in a plug connector;
  connecting said signal input module to a source of a known signal representative of an information carrying signal;
  measuring the signal present at said output end;
  if the desired signal is not present at said output end, rejecting said input module for use in a larger assembly;
  if the desired signal is present at said output end, accepting said input module for use in a larger assembly;
  assembling a signal output module having an input end to be connected to an information signal to be amplified and an output end that terminates in a plug connector;
  connecting said signal output module to a source of a known signal representative of an information carrying signal;
  measuring the signal present at said output end;
  if the desired signal is not present at said output end, rejecting said output module for use in a larger assembly;
  if the desired signal is present at said output end, accepting said output module for use in a larger assembly;
  assembling a signal amplifying module including at least an amplifying stage and having an input end and an output end, said input end of said signal amplifying module being connected to a coupler that has a pump input fiber and a signal input fiber and an output fiber;
  providing a test information signal to said signal input fiber;
  providing pump power to said amplifying stage through said power input fiber;
  measuring the signal at the output end of said signal amplifying module;
  if the desired signal is not present at said output end, rejecting said signal amplifying module for use in a larger assembly;
  if the desired signal is present at said output end, accepting said signal amplifying module for use in a larger assembly;
  mounting an accepted signal-amplifying module, an accepted input module, an accepted output module and an accepted pump module on a substrate;
  optically connecting each of said input module, output module and pump module to said signal amplifying module; and
  testing each of said modules on said substrate.

36. The method of claim 35, further comprising mounting a second accepted pump module having a pump wavelength of $\lambda_2$ on said substrate;
  optically connecting said second accepted pump module to said accepted signal amplifying module; and
  testing said second accepted pump module on said substrate.

37. A method of making n different types of optical amplifiers on one manufacturing line, n being equal to or greater than 2, said method comprising the steps of:
  a) for each of the circuits which comprise each of the optical amplifiers to be made, providing a supply of at least four functional groups of sub-units, at least one functional group containing at least n different types of sub-units, each of the sub-units in 3 of said functional groups including a pluggable optical connector half and each of the sub-units of the fourth of said functional groups including 3 pluggable optical connector halves; and,
  b) depending on specification of the optical amplifier to be made, selecting a specific sub-unit from each said functional groups and plugging together each of said selected sub-units to form an optical amplifier having the desired specification.

* * * * *